(12) United States Patent
Ota

(10) Patent No.: US 9,488,799 B2
(45) Date of Patent: Nov. 8, 2016

(54) IMAGING LENS AND IMAGING DEVICE PROVIDED WITH THE SAME

(71) Applicant: FUJIFILM Corporation, Tokyo (JP)

(72) Inventor: Motoari Ota, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 73 days.

(21) Appl. No.: 14/514,744

(22) Filed: Oct. 15, 2014

(65) Prior Publication Data
US 2015/0109691 A1     Apr. 23, 2015

(30) Foreign Application Priority Data
Oct. 18, 2013   (JP) .................... 2013-216926

(51) Int. Cl.
*G02B 9/62*     (2006.01)
*G02B 13/00*    (2006.01)

(52) U.S. Cl.
CPC ............. *G02B 9/62* (2013.01); *G02B 13/0045* (2013.01)

(58) Field of Classification Search
CPC .............................. G02B 13/0045; G02B 9/62
USPC ................................................... 359/642–830
See application file for complete search history.

(56) References Cited

U.S. PATENT DOCUMENTS

| | | | |
|---|---|---|---|
| 2013/0003193 A1 | 1/2013 | Huang | |
| 2014/0098239 A1 | 4/2014 | Jeong | |
| 2014/0111876 A1* | 4/2014 | Tang | G02B 13/0045 359/757 |
| 2015/0331225 A1* | 11/2015 | Huang | G02B 9/62 348/335 |

FOREIGN PATENT DOCUMENTS

WO    WO2012-169778    12/2012

* cited by examiner

*Primary Examiner* — Mahidere Sahle
(74) *Attorney, Agent, or Firm* — Young & Thompson

(57) ABSTRACT

An imaging lens substantially consists of six lenses consisting of, in order from the object side: a first lens having a biconvex shape; a second lens having a negative refractive power; a third lens having a positive refractive power; a fourth lens having a positive refractive power; a fifth lens having a negative refractive power and having a concave surface toward the object side; and a sixth lens having a negative refractive power and having a concave surface toward the object side.

19 Claims, 12 Drawing Sheets

EXAMPLE 1

EXAMPLE 3

IMAGING LENS AND IMAGING DEVICE PROVIDED WITH THE SAME

CROSS-REFERENCE TO RELATED APPLICATIONS

The present application claims priority under 35 U.S.C. §119 to Japanese Patent Application No. 2013-216926, filed on Oct. 18, 2013. The above application is hereby expressly incorporated by reference, in its entirety, into the present application.

BACKGROUND OF THE INVENTION

1. Field of the Invention

The present invention relates to a fixed-focus imaging lens that forms an optical image of a subject on an image sensor, such as a CCD (Charge Coupled Device) or CMOS (Complementary Metal Oxide Semiconductor), and an imaging device that is provided with the imaging lens and performs imaging, such as an imaging device incorporated in a digital still camera, a mobile phone with camera, a PDA (Personal Digital Assistance), a smartphone, a tablet-type terminal, a portable video game player, etc.

2. Description of the Related Art

Along with the spread of personal computers in ordinary homes, etc., digital still cameras that are capable of inputting image information, such as photographed landscapes and portraits, to a personal computer are also rapidly spreading. Further, more and more mobile phones, smartphones and tablet-type terminals are equipped with a camera module for inputting images. The above-mentioned devices capable of imaging use an image sensor, such as a CCD or CMOS. In recent years, such image sensors are becoming more compact, and there are also demands for compact imaging devices and compact imaging lenses to be incorporated in the imaging devices. At the same time, pixel density of such image sensors is also becoming higher, and imaging lenses with higher resolution and higher performance are demanded. For example, performance that can accommodate a high pixel density of 5 megapixel or more, and more preferably 8 megapixel or more is demanded.

In order to meet the above-described demands, an imaging lens formed by a relatively large number of lenses, namely, having a five-lens configuration has been proposed. Further, in recent years, an imaging lens having a six-lens configuration has been proposed. For example, each of International Patent Publication No. 12/169778 (hereinafter, Patent Document 1) and U.S. Patent Application Publication No. 20130003193 (hereinafter, Patent Document 2) proposes an imaging lens having a six-lens configuration which consists of, in order from the object side, a first lens having a positive refractive power, a second lens having a negative refractive power, a third lens having a positive refractive power, a fourth lens having a positive refractive power, a fifth lens having a negative refractive power, and a sixth lens having a negative refractive power.

SUMMARY OF THE INVENTION

On the other hand, for an imaging lens for use, in particular, with devices that are becoming thinner and thinner, such as PDAs, smartphones and tablet-type terminals, it is desired to achieve an imaging lens with a reduced entire lens length and a wide angle of view while accommodating high-pixel density image sensors. However, the imaging lens disclosed in each of Patent Documents 1 and 2 does not have a sufficiently wide angle of view.

In view of the above-described circumstances, the present invention is directed to providing an imaging lens that can achieve a reduced entire lens length and a wide angle of view while accommodating high-pixel density image sensors, and an imaging device that is provided with the imaging lens and capable of capturing a high-resolution image.

An imaging lens of the invention substantially consists of six lenses consisting of, in order from the object side: a first lens having a biconvex shape; a second lens having a negative refractive power; a third lens having a positive refractive power; a fourth lens having a positive refractive power; a fifth lens having a negative refractive power and having a concave surface toward the object side; and a sixth lens having a negative refractive power and having a concave surface toward the object side.

When the imaging lens of the invention further adopts the following preferred configurations, higher optical performance can be provided.

In the imaging lens of the invention, it is preferred that the sixth lens have a concave surface toward the image side.

In the imaging lens of the invention, it is preferred that the fifth lens have a convex surface toward the image side.

In the imaging lens of the invention, it is preferred that second lens have a concave surface toward the image side.

it is preferred that the imaging lens of the invention satisfy any one of or any combination of the condition expressions (1) to (9) and (1-1) to (6-1) below:

$$0.7 < f/f1 < 5 \tag{1}$$

$$1.1 < f/f1 < 3 \tag{1-1}$$

$$1.18 < f/f4 < 5 \tag{2}$$

$$1.21 < f/f4 < 5 \tag{2-1}$$

$$-1.6 < (L6r + L6f)/(L6r - L6f) < -0.7 \tag{3}$$

$$-0.92 < (L6r + L6f)/(L6r - L6f) < -0.7 \tag{3-1}$$

$$-1 < f \times P45 < 0 \tag{4}$$

$$-0.88 < f \times P45 < 0 \tag{4-1}$$

$$0 < f6/f5 < 0.11 \tag{5}$$

$$0.035 < f6/f5 < 0.08 \tag{5-1}$$

$$-3 < f/f5 < -0.05 \tag{6}$$

$$-0.19 < f/f5 < -0.055 \tag{6-1}$$

$$-3 < f/f6 < -1.47 \tag{7}$$

$$0.5 < f \tan \omega / L6r < 20 \tag{8}$$

$$0.5 < (L1r + L1f)/(L1r - L1f) < 1 \tag{9}$$

where f is a focal length of the entire system,
f1 is a focal length of the first lens,
f4 is a focal length of the fourth lens,
f5 is a focal length of the fifth lens,
f6 is a focal length of the sixth lens,
L1f is a paraxial radius of curvature of the object-side surface of the first lens,
L1r is a paraxial radius of curvature of the image-side surface of the first lens, L6f is a paraxial radius of curvature of the object-side surface of the sixth lens, L6r is a paraxial radius of curvature of the image-side surface of the sixth lens, ω is a half angle of view, and P45 is a refractive power of an air lens formed by the image-side surface of the fourth lens and the object-side surface of the fifth lens, where the refractive power of the air lens is calculated according to the equation (P) below:

$$P45 = \frac{1-Nd4}{L4r} + \frac{Nd5-1}{L5f} - \frac{(1-Nd4)\times(Nd5-1)\times D9}{L4r \times L5f} \qquad (P)$$

where Nd4 is a refractive index with respect to the d-line of the fourth lens, Nd5 is a refractive index with respect to the d-line of the fifth lens, L4r is a paraxial radius of curvature of the image-side surface of the fourth lens, L5f is a paraxial radius of curvature of the object-side surface of the fifth lens, and D9 is an air space along the optical axis between the fourth lens and the fifth lens.

It should be noted that, with respect to the imaging lens of the invention, the expression "substantially consisting of six lenses" means that the imaging lens of the invention may include, in addition to the six lenses: lenses substantially without any power; optical elements other than lenses, such as a stop and a cover glass; mechanical components, such as a lens flange, a lens barrel, and a camera shake correcting mechanism; etc.

It should be noted that the sign (positive or negative) with respect to the surface shape and the refractive power of any lens having an aspheric surface of the above-described lenses is about the paraxial region. The sign (positive or negative) with respect to the radius of curvature means that a surface shape that is convex toward the object side is positive and a surface shape that is convex toward the image side is negative.

The imaging device according to the invention comprises the imaging lens of the invention.

According to the imaging lens of the invention, which has the six lens configuration as a whole, the configuration of each lens element, in particular, the shape of each of the first lens, the fifth lens and the sixth lens is optimized, thereby accomplishing a lens system that can achieve a reduced entire length and a wide angle of view while accommodating high-pixel density image sensors.

According to the imaging device of the invention, which is provided with the imaging lens of the invention, the size of the device in the optical axis direction of the imaging lens can be reduced, and a high-resolution image can be captured with a wide angle of view.

DESCRIPTION OF THE PREFERRED EMBODIMENTS

Hereinafter, embodiments of the present invention will be described in detail with reference to the drawings.

Figure 1:
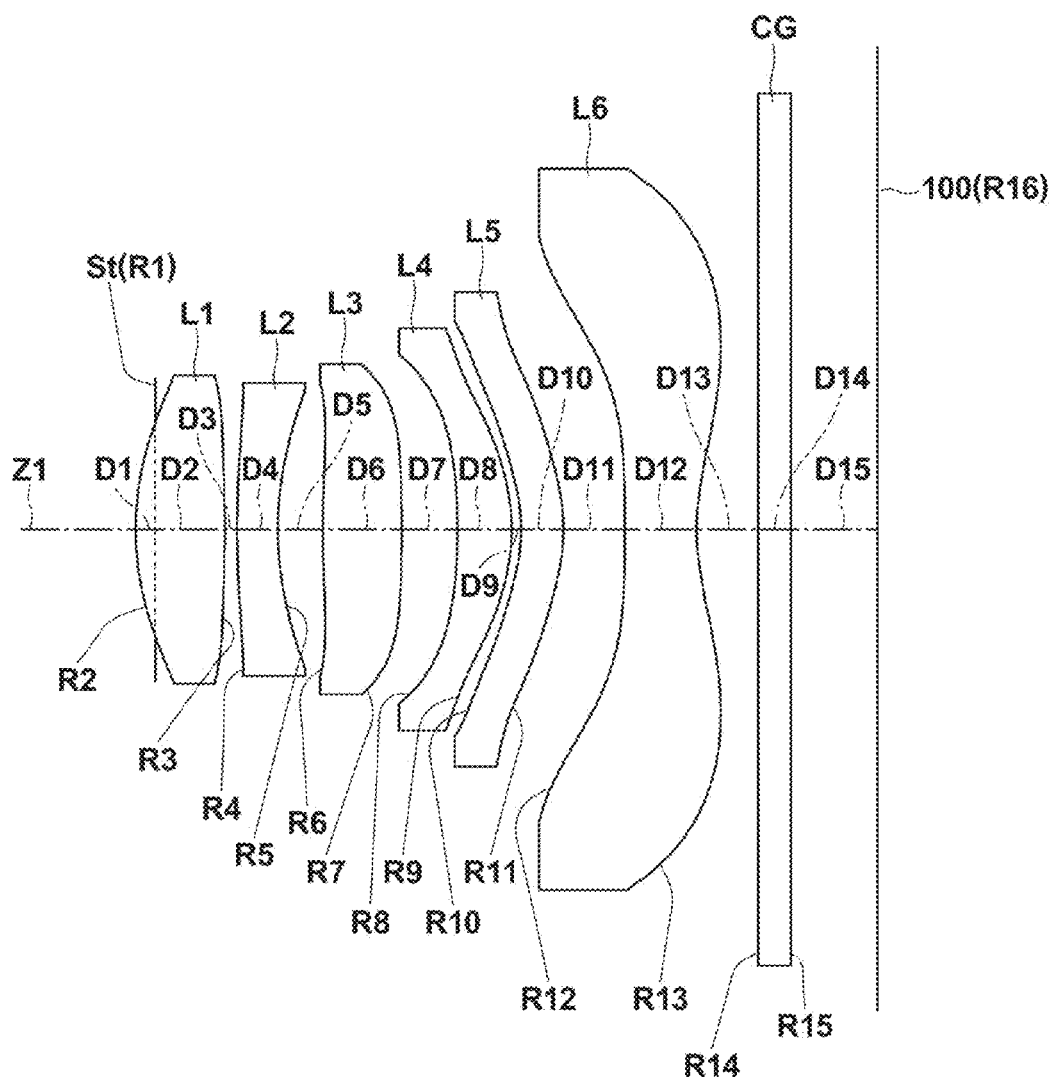
FIG. 1 is a lens sectional view illustrating a first configuration example of an imaging lens according to one embodiment of the invention and corresponding to Example 1.
Figure 2:
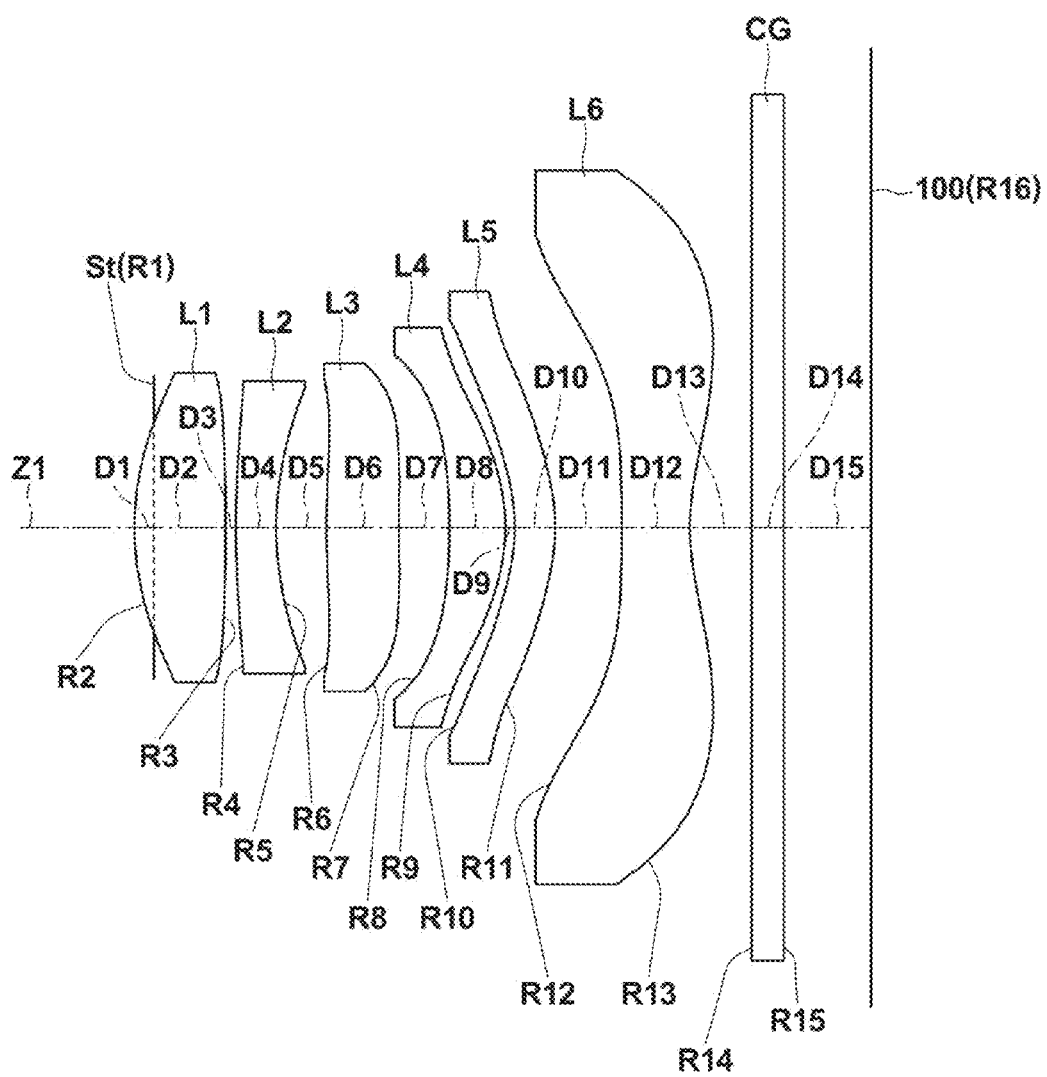
FIG. 2 is a lens sectional view illustrating a second configuration example of the imaging lens according to one embodiment of the invention and corresponding to Example 2.
Figure 3:
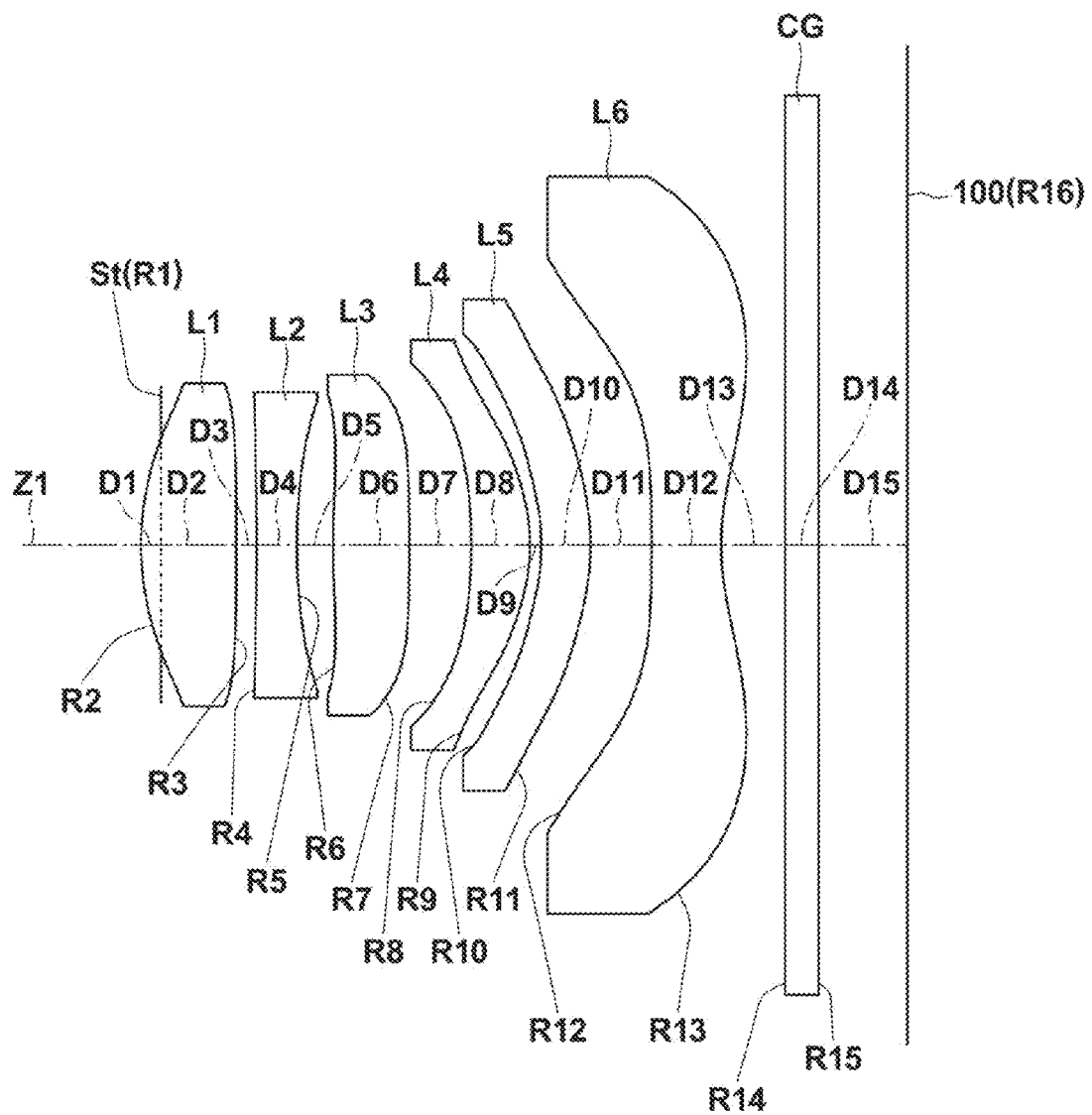
FIG. 3 is a lens sectional view illustrating a third configuration example of the imaging lens according to one embodiment of the invention and corresponding to Example 3.
Figure 4:
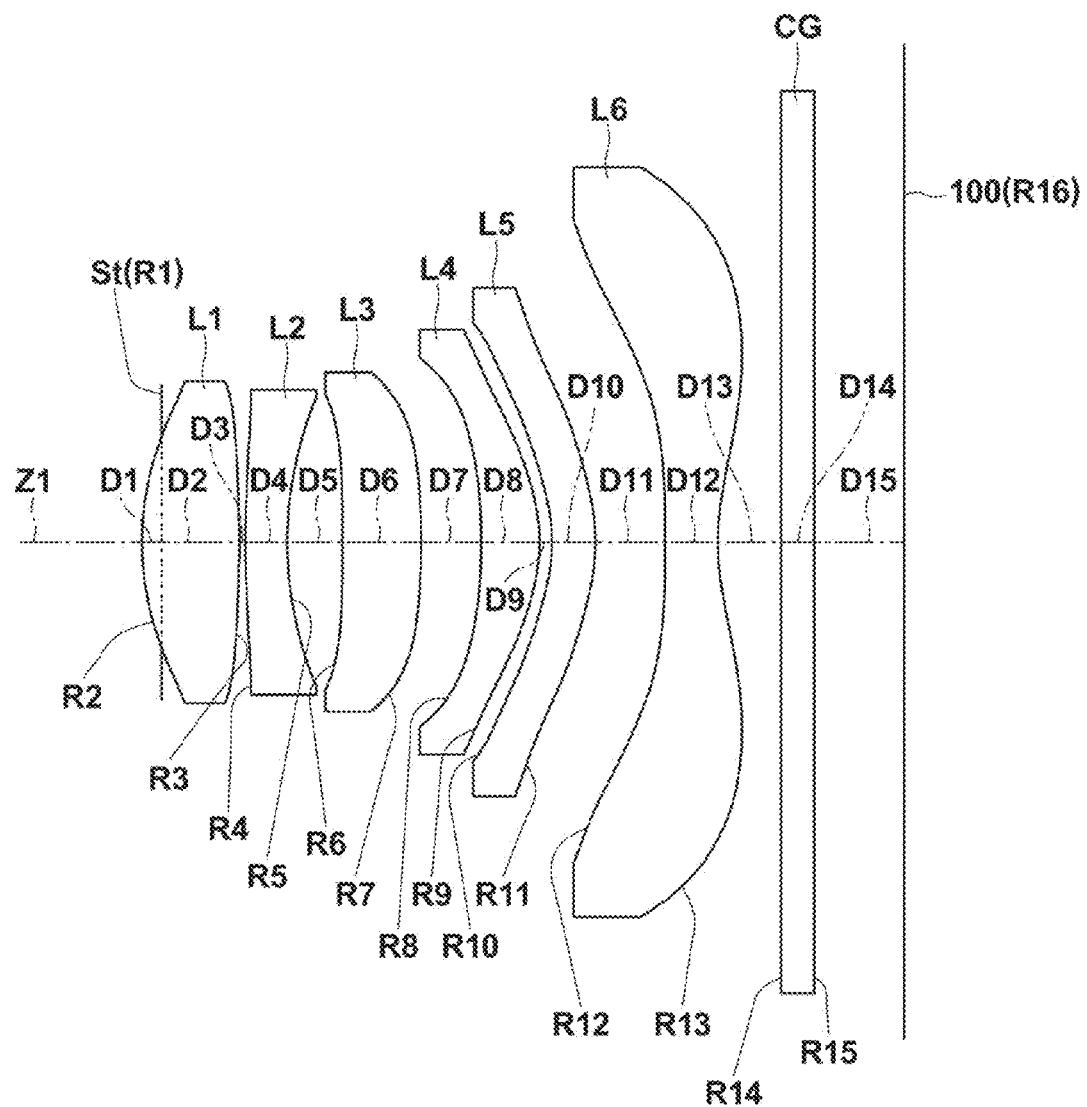
FIG. 4 is a lens sectional view illustrating a fourth configuration example of the imaging lens according to one embodiment of the invention and corresponding to Example 4.
Figure 5:
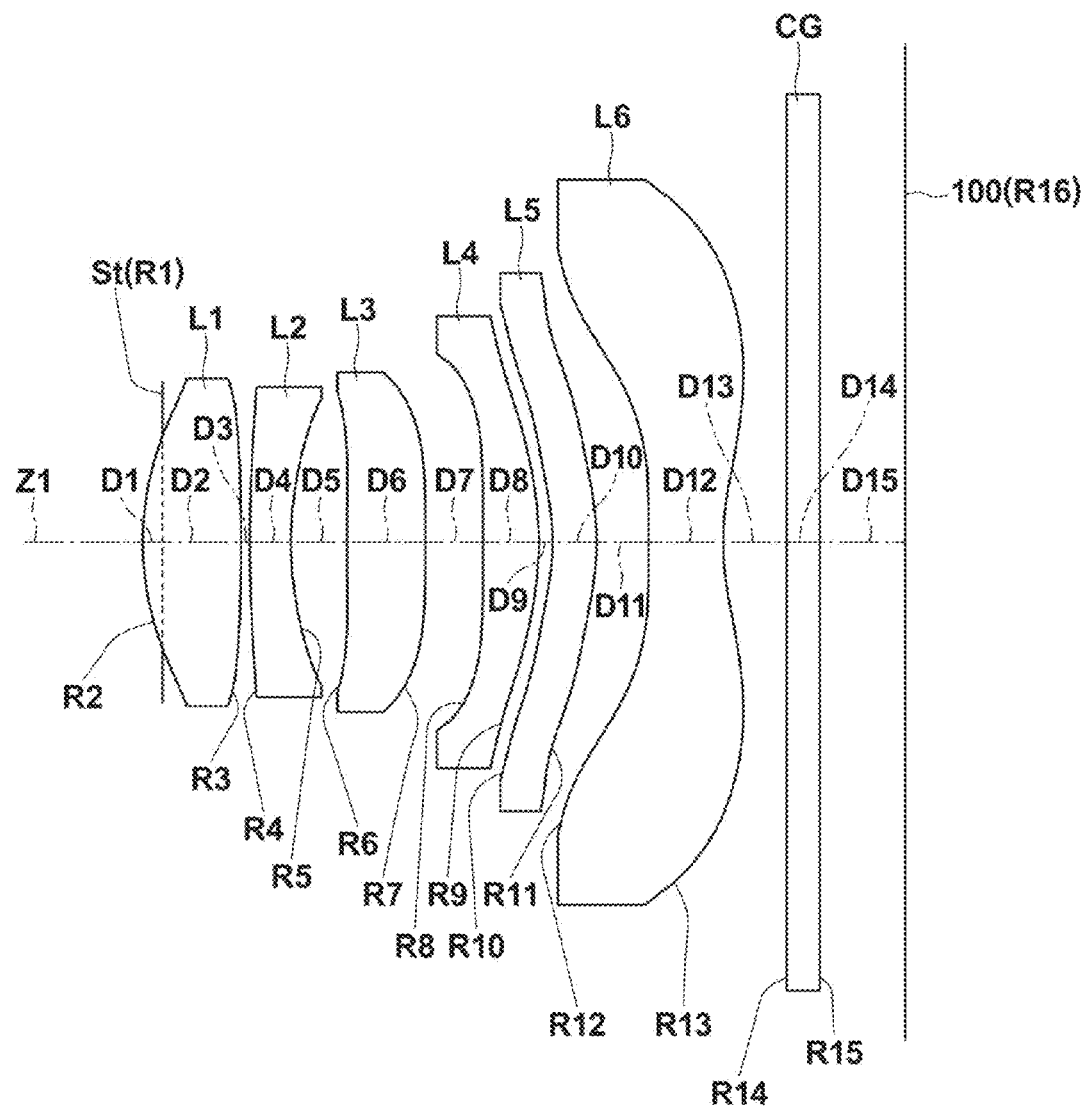
FIG. 5 is a lens sectional view illustrating a fifth configuration example of the imaging lens according to one embodiment of the invention and corresponding to Example 5.
Figure 6:
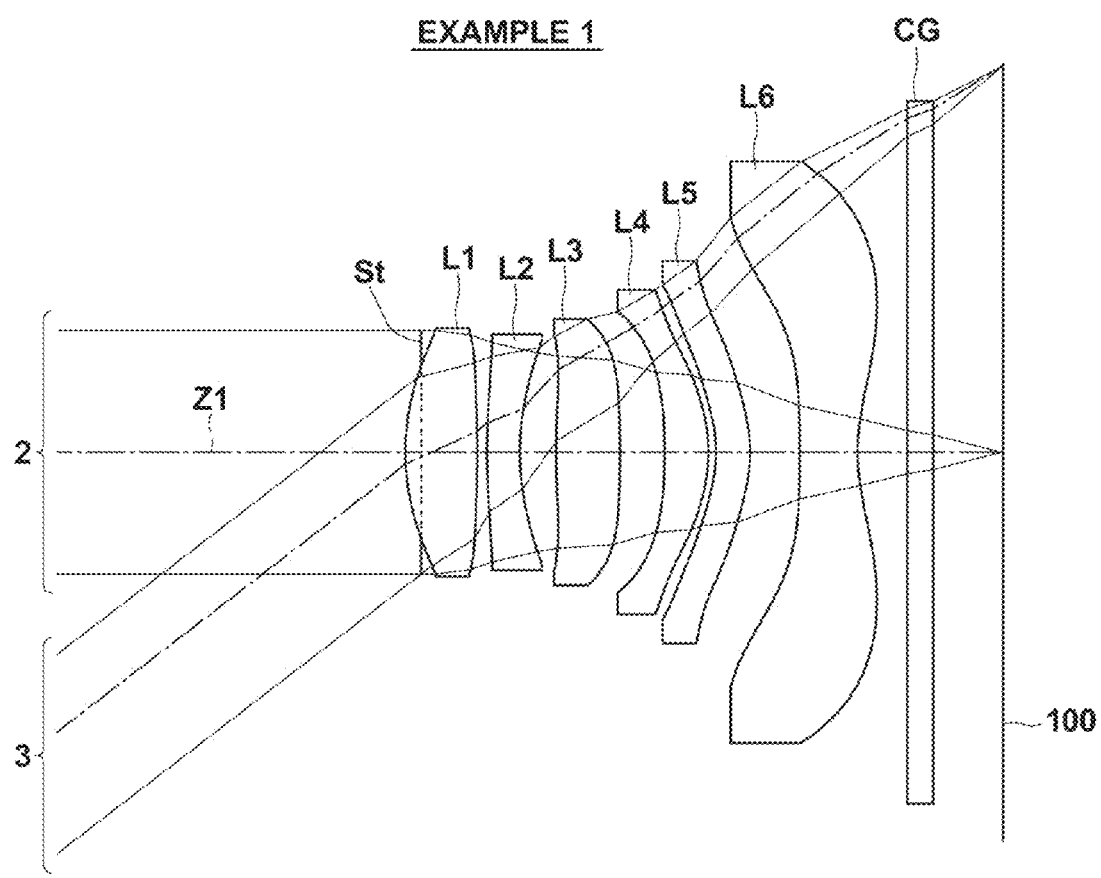
FIG. 6 is a diagram showing optical paths through the imaging lens shown in FIG. 1.

FIG. 1 shows a first configuration example of an imaging lens according to a first embodiment of the invention. This configuration example corresponds to a lens configuration of a first numerical example (shown in Tables 1 and 2), which will be described later. Similarly, FIGS. 2 to 5 show cross-sectional configurations of second to fifth configuration examples corresponding to imaging lenses L of numerical examples (Table 3 to Table 10) according to second to fifth embodiments, which will be described later. In FIGS. 1 to 5, each symbol "Ri" denotes a radius of curvature of the i-th surface, where the most object-side surface of the lens elements is the first surface and the surface number is sequentially increased toward the image side (the formed image side), and each symbol "Di" denotes a surface distance between the i-th surface and the i+1-th surface along the optical axis Z1. It should be noted that these configuration examples have the same basic configuration. Therefore the following description is made based on the configuration example of the imaging lens L shown in FIG. 1, and the configuration examples shown in FIGS. 2 to 5 are described as necessary. FIG. 6 is a diagram showing optical paths through the imaging lens shown in FIG. 1, where optical paths of an axial bundle of rays 2 and a bundle of rays 3 at the maximum angle of view from an object point at infinity are shown.

The imaging lens L according to each embodiment of the invention is preferably usable with various imaging devices using an image sensor, such as a CCD or CMOS, in particular, relatively small portable terminal devices, such as digital still cameras, mobile phones with camera, smartphones, tablet-type terminals and PDAs. The imaging lens L includes, in order from the object side along the optical axis Z1, a first lens L1, a second lens L2, a third lens L3, a fourth lens L4, a fifth lens L5, and a sixth lens L6.

Figure 12:
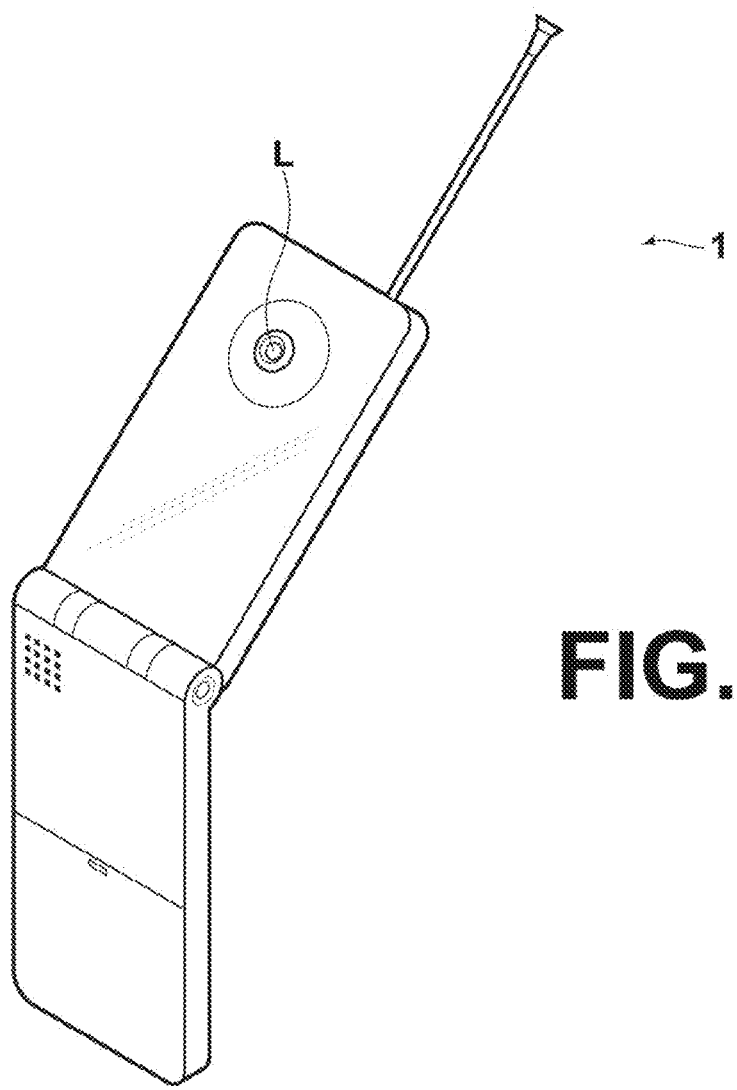
FIG. 12 shows an imaging device in the form of a mobile phone terminal provided with the imaging lens according to the invention.

FIG. 12 shows the appearance of a mobile phone terminal which is an imaging device 1 according to one embodiment of the invention. The imaging device 1 according to the embodiment of the invention includes the imaging lens L of any of the embodiments of the invention, and an image sensor 100 (see FIG. 1), such as a CCD, for outputting an imaging signal according to an optical image formed by the imaging lens L. The image sensor 100 is placed in the image plane of the imaging lens L.

Figure 13:
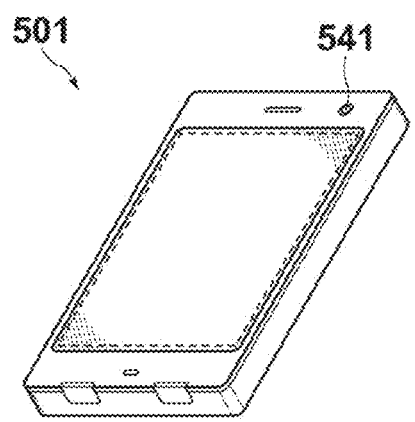
FIG. 13 shows an imaging device in the form of a smartphone provided with the imaging lens according to the invention.

FIG. 13 shows the appearance of a smartphone which is an imaging device 501 according to one embodiment of the invention. The imaging device 501 of the embodiment of the invention includes a camera unit 541 which includes the imaging lens L of any of the embodiments of the invention and an image sensor 100 (see FIG. 1), such as a CCD, for outputting an imaging signal according to an optical image formed by the imaging lens L. The image sensor 100 is placed in the image plane of the imaging lens L.

Various optical members CG may be provided between the sixth lens L6 and the image sensor 100 depending on the configuration of the camera provided with the imaging lens. For example, a cover glass for protecting the imaging area, and a flat plate-like optical member, such as an infrared cut-off filter, may be provided between the sixth lens L6 and the image sensor 100. In this case, for example, a flat plate-like cover glass with a coating having a filter effect, such as an effect of an infrared cut-off filter or ND filter, or a material having the same effect may be used as the optical member CG.

Alternatively, without using any optical member CG, the sixth lens L6 may be provided with a coating having the same effect as the optical member CG, for example. This allows reduction of the number of parts forming the lens and the entire length of the lens.

It is preferred that the imaging lens L include an aperture stop St disposed on the object side of the object-side surface of the second lens L2. When the aperture stop St is disposed in this manner, increase of the incidence angle of rays traveling through the optical system on the image plane (the image sensor), in particular, at the marginal area of the imaging area can be suppressed. In order to enhance this effect, it is preferred that the aperture stop St be disposed on the object side of the object-side surface of the first lens L1. It should be noted that the description "disposed on the object side of the object-side surface of the second lens" means that the position of the aperture stop along the optical axis direction is the same position as the intersection between a marginal axial ray and the object-side surface of the second lens L2 or a position nearer to the object side than the intersection. Similarly, "disposed on the object side of the object-side surface of the first lens" means that the position of the aperture stop along the optical axis direction is the same position as the intersection between a marginal axial ray and the object-side surface of the first lens L1 or a position nearer to the object side than the intersection.

In the case where the aperture stop St is disposed on the object side of the object-side surface of the first lens L1 along the optical axis direction, it is preferred that the aperture stop St be disposed on the image side of the apex of the surface of the first lens L1. When the aperture stop St is disposed on the image side of the apex of the surface of the first lens L1 in this manner, reduction of the entire length of the imaging lens L including the aperture stop St can be achieved. It should be noted that, in the imaging lenses L according to the first to the fifth configuration examples shown in FIGS. 1 to 5, respectively, the aperture stop St is disposed on the object side of the object-side surface of the first lens L1, and the aperture stop St is disposed on the image side of the apex of the surface of the first lens L1. It should be noted that the aperture stop St shown in FIGS. 1 to 6 does not necessarily represent the size and shape thereof, but represents the position thereof along the optical axis Z1.

In the imaging lens L, the first lens L1 has a positive refractive power in the vicinity of the optical axis. This is advantageous for reduction of the entire length of the lens. Further, the first lens L1 has a biconvex shape in the vicinity of the optical axis. This preferably allows reduction of the entire length while allowing successful correction of spherical aberration.

The second lens L2 has a negative refractive power in the vicinity of the optical axis. This allows successful correction of spherical aberration, field curvature, and longitudinal chromatic aberration. It is preferred that the image-side surface of the second lens L2 be a concave surface in the vicinity of the optical axis. This preferably allows reduction of the entire length, successful correction of spherical aberration, and suppressing field curvature while reducing longitudinal chromatic aberration. The second lens L2 may have a negative meniscus shape with a concave surface toward the image side or may have a biconcave shape in the vicinity of the optical axis.

Each of the third lens L3 and the fourth lens L4 has a positive refractive power in the vicinity of the optical axis. Each of the fifth lens L5 and the sixth lens L6 has a negative refractive power in the vicinity of the optical axis. Regarding the first to the fourth lenses L1 to L4 as one positive lens group, and the fifth to the sixth lenses L5 to L6 as one negative lens group, the imaging lens L has a telephoto configuration, and this preferably allows reduction of the entire length. In this configuration, arranging the lenses having a positive refractive power, i.e., the third lens L3 and the fourth lens L4, in a row allows increasing the refractive power of the positive lens group formed by the first to fourth lenses L1 to L4 as a whole while suppressing the refractive powers of the third lens L3 and the fourth lens L4, and this preferably allows correction of spherical aberration, astigmatism, etc., while achieving reduction of the entire length.

It is preferred that the fourth lens L4 have a shape with a convex surface toward the image side in the vicinity of the optical axis. The fourth lens L4 having a positive refractive power in the vicinity of the optical axis and having a convex surface toward the image side in the vicinity of the optical axis allows successful correction of astigmatism.

The object-side surface of the fifth lens L5 is a concave surface in the vicinity of the optical axis. This allows successful correction of astigmatism, and is advantageous for providing an imaging lens with a wide angle of view. It is preferred that the image-side surface of the fifth lens L5 be a convex surface in the vicinity of the optical axis. In a case where the fifth lens L5 has a meniscus shape with a concave surface toward the object side in the vicinity of the optical axis, more successful correction of astigmatism can be achieved, and the fifth lens L5 having such a meniscus shape is more advantageous for providing an imaging lens with a wide angle of view.

The object-side surface of the sixth lens L6 is a concave surface in the vicinity of the optical axis. This allows successful correction of astigmatism, and is advantageous for providing an imaging lens with a wide angle of view. It is preferred that the image-side surface of the sixth lens L6 be a concave surface in the vicinity of the optical axis. This preferably allows reduction of the entire length and successful correction of field curvature.

Further, it is preferred that the sixth lens L6 have, on the image-side surface thereof, an aspheric shape having at least one inflection point. This allows suppressing increase of the incidence angle of rays traveling through the optical system on the image plane (the image sensor), in particular, at the marginal area of the imaging area. It should be noted that the "inflection point" of the image-side surface of the sixth lens L6 refers to a point where the shape of the image-side surface of the sixth lens L6 changes from a convex shape to a concave shape (or from a concave shape to a convex shape) toward the image side. The position of the inflection point can be any position within an effective radius of the image-side surface of the sixth lens L6 along the radial direction from the optical axis.

According to the above-described imaging lens L, which has the six-lens configuration as a whole, the configuration of each of the lens elements, the first to the sixth lenses L1 to L6, is optimized, thereby achieving a lens system having a wide angle of view and having high imaging performance capable of accommodating high-pixel density image sensors while achieving reduction of the entire length of the lens.

In order to achieve even higher performance, it is preferred that each of the first to the sixth lenses L1 to L6 of the imaging lens L have an aspheric surface on at least one side thereof.

Further, it is preferred that each of the first to the sixth lenses L1 to L6 forming the imaging lens L be a single lens rather than a cemented lens. In the case where all the lenses are single lenses, the number of lens surfaces in contact with air is greater than that in a case where any of the lenses are cemented together to form a cemented lens. This allows higher freedom of design of each lens, and facilitates providing an imaging lens with a reduced entire length of the lens and a wide angle of view and providing a high resolution.

Still further, in a case where the lens configuration of each of the first to the sixth lenses L1 to L6 forming the imaging lens L is set to provide, for example, a full angle of view of 70° or more, as with the imaging lenses according to the first to the fifth embodiments, the imaging lens L is preferably applicable to an image sensor incorporated in a mobile phone, or the like, and having a size that meets demands for high resolution, while achieving reduction of the entire length of the lens.

Next, operation and effects related to condition expressions of the imaging lens L having the above-described configuration are described in more detail. It is preferred that the imaging lens L satisfy any one or any combination of the condition expressions described below. It is preferred that one or more condition expressions to be satisfied are selected as appropriate depending on requirements on the imaging lens L.

First, it is preferred that focal length f1 of the first lens L1 and focal length f of the entire system satisfy the condition expression (1) below:

$$0.7 < f/f1 < 5 \tag{1}$$

The condition expression (1) defines a preferred numerical range of the ratio of the focal length f of the entire system to the focal length f1 of the first lens L1. When the refractive power of the first lens L1 is ensured such that the ratio does not become smaller than or equal to the lower limit of the condition expression (1), reduction of the entire length can preferably be achieved. On the other hand, when the refractive power of the first lens L1 is kept within a range where the ratio does not become greater than or equal to the upper limit of the condition expression (1), successful correction of spherical aberration and successful correction of astigmatism at a low angle of view can be achieved. In order to enhance this effect, it is more preferred that the condition expression (1-1) below be satisfied, it is even more preferred that the condition expression (1-2) below be satisfied, and it is particularly preferred that the condition expression (1-3) below be satisfied:

$$1.1 < f/f1 < 3 \tag{1-1}$$

$$1.18 < f/f1 < 2.8 \tag{1-2}$$

$$1.22 < f/f1 < 2.5 \tag{1-3}$$

Further, it is preferred that focal length f4 of the fourth lens L4 and the focal length f of the entire system satisfy the condition expression (2) below:

$$1.18 < f/f4 < 5 \tag{2}$$

The condition expression (2) defines a preferred numerical range of the ratio of the focal length f of the entire system to the focal length f4 of the fourth lens L4. When the refractive power of the fourth lens L4 is ensured such that the ratio does not become smaller than or equal to the lower limit of the condition expression (2), reduction of the entire length can preferably be achieved. On the other hand, when the refractive power of the fourth lens L4 is kept within a range where the ratio does not become greater than or equal to the upper limit of the condition expression (2), successful correction of spherical aberration can be achieved. In order to enhance this effect, it is more preferred that the condition expression (2-1) below be satisfied, and it is even more preferred that the condition expression (2-2) below be satisfied:

$$1.21 < f/f4 < 5 \tag{2-1}$$

$$1.24 < f/f4 < 3 \tag{2-2}$$

Further, it is preferred that paraxial radius of curvature L6f of the object-side surface of the sixth lens L6 and paraxial radius of curvature L6r of the image-side surface of the sixth lens L6 satisfy the condition expression (3) below:

$$-1.6 < (L6r+L6f)/(L6r-L6f) < -0.7 \tag{3}$$

The condition expression (3) defines a preferred numerical range about the paraxial radius of curvature L6f of the object-side surface of the sixth lens L6 and the paraxial radius of curvature L6r of the image-side surface of the sixth lens L6. When the paraxial radius of curvatures of the object-side surface and the image-side surface of the sixth lens L6 are set such that the ratio shown above does not become smaller than or equal to the lower limit of the condition expression (3), correction of field curvature can be preferably achieved while achieving reduction of the entire length. On the other hand, when the paraxial radius of curvatures of the object-side surface and the image-side surface of the sixth lens L6 are set such that the ratio shown above does not become greater than or equal to the upper limit of the condition expression (3), correction of astigmatism can preferably be achieved. In order to enhance this effect, it is more preferred that the condition expression (3-1) below be satisfied, and it is even more preferred that the condition expression (3-2) below be satisfied:

$$-0.92<(L6r+L6f)/(L6r-L6f)<-0.7 \quad (3\text{-}1),$$

$$-0.92<(L6r+L6f)/(L6r-L6f)<-0.77 \quad (3\text{-}2).$$

Further, it is preferred that the focal length f of the entire system and refractive power P45 of an air lens formed by the image-side surface of the fourth lens L4 and the object-side surface of the fifth lens L5 satisfy the condition expression (4) below:

$$-1<f\times P45<0 \quad (4).$$

The value of P45 is calculated according to the equation (P) below using refractive index Nd4 with respect to the d-line of the fourth lens L4, refractive index Nd5 with respect to the d-line of the fifth lens L5, paraxial radius of curvature L4r of the image-side surface of the fourth lens L4, paraxial radius of curvature L5f of the object-side surface of the fifth lens L5, and air space D9 along the optical axis between the fourth lens L4 and the fifth lens L5:

$$P45 = \frac{1-Nd4}{L4r} + \frac{Nd5-1}{L5f} - \frac{(1-Nd4)\times(Nd5-1)\times D9}{L4r \times L5f} \quad (P)$$

The refractive power is inverse of the focal length. When the focal length of the air lens formed by the image-side surface of the fourth lens L4 and the object-side surface of the fifth lens L5 is f89, the condition expression (4) defines a preferred numerical range of the ratio of the focal length f of the entire system to the focal length f89. Configuring the imaging lens such that the value of f×P45 does not become smaller than or equal to the lower limit of the condition expression (4) is advantageous for correction of field curvature. On the other hand, configuring the imaging lens such that the value of f×P45 does not become greater than or equal to the upper limit of the condition expression (4) is advantageous for correction of distortion at an intermediate angle of view. In order to enhance this effect, it is more preferred that the condition expression (4-1) below be satisfied:

$$-0.88<f\times P45<0 \quad (4\text{-}1).$$

Further, it is preferred that focal length f5 of the fifth lens L5 and focal length f6 of the sixth lens L6 satisfy the condition expression (5) below:

$$0<f6/f5<0.11 \quad (5).$$

The condition expression (5) defines a preferred numerical range of the ratio of the focal length f6 of the sixth lens L6 to the focal length f5 of the fifth lens L5. Each of the fifth lens L5 and the sixth lens L6 of the invention has a negative refractive power, and therefore the lower limit of the condition expression (5) is satisfied. Setting allocation of the refractive powers of the fifth lens L5 and the sixth lens L6 such that the ratio does not become greater than or equal to the upper limit of the condition expression (5) is advantageous for reduction of the entire length and correction of field curvature.

Further, it is more preferred that the focal length f5 of the fifth lens L5 and the focal length f6 of the sixth lens L6 satisfy the condition expression (5-1) below:

$$0.035<f6/f5<0.08 \quad (5\text{-}1).$$

Allocating the refractive powers of the fifth lens L5 and the sixth lens L6 such that the ratio does not become smaller than or equal to the lower limit of the condition expression (5-1) prevents the negative refractive power of the sixth lens L6 from becoming relatively excessively strong, and this allows suppressing distortion at an intermediate angle of view and suppressing increase of the incidence angle of rays traveling through the optical system on the image plane (the image sensor) at an intermediate angle of view. On the other hand, when the refractive powers of the fifth lens L5 and the sixth lens L6 are allocated such that the ratio does not become greater than or equal to the upper limit of the condition expression (5-1), the effect with respect to the upper limit of the condition expression (5) can be enhanced.

Further, it is preferred that the focal length f5 of the fifth lens L5 and the focal length f of the entire system satisfy the condition expression (6) below:

$$-3<f/f5<-0.05 \quad (6).$$

The condition expression (6) defines a preferred numerical range of the ratio of the focal length f of the entire system to the focal length f5 of the fifth lens L5. When the refractive power of the fifth lens L5 kept within a range where the ratio does not become smaller than or equal to the lower limit of the condition expression (6), distortion can be suppressed at an intermediate angle of view and increase of the incidence angle of rays traveling through the optical system on the image plane (the image sensor) can be suppressed at an intermediate angle of view. On the other hand, ensuring the refractive power of the fifth lens L5 such that the ratio does not become greater than or equal to the upper limit of the condition expression (6) is advantageous for reduction of the entire length. In order to enhance this effect, it is more preferred that the condition expression (6-1) below be satisfied:

$$-0.19<f/f5<-0.055 \quad (6\text{-}1).$$

Further, it is preferred that the focal length f6 of the sixth lens L6 and the focal length f of the entire system satisfy the condition expression (7) below:

$$-3<f/f6<-1.47 \quad (7).$$

The condition expression (7) defines a preferred numerical range of the ratio of the focal length f of the entire system to the focal length f6 of the sixth lens L6. When the refractive power of the sixth lens L6 is kept within a range where the ratio does not become smaller than or equal to the lower limit of the condition expression (7), distortion can be suppressed at an intermediate angle of view and increase of the incidence angle of rays traveling through the optical system on the image plane (the image sensor) can be suppressed at an intermediate angle of view. On the other hand, ensuring the refractive power of the sixth lens L6 such that the ratio does not become greater than or equal to the upper limit of the condition expression (7) is preferable and advantageous for reduction of the entire length. In order to enhance this effect, it is more preferred that the condition expression (7-1) be satisfied:

$$-2.2<f/f6<-1.51 \quad (7\text{-}1).$$

Further, it is preferred that the focal length f of the entire system, a half angle of view ω, and a paraxial radius of curvature L6r of the image-side surface of the sixth lens L6 satisfy the condition expression (8) below:

$$0.5 < f \cdot \tan \omega / L6r < 20 \quad (8).$$

The condition expression (8) defines a preferred numerical range of the ratio of paraxial image height (f·tan ω) to the paraxial radius of curvature L6r of the image-side surface of the sixth lens L6. When the ratio does not become smaller than or equal to the lower limit of the condition expression (8), the absolute value of the paraxial radius of curvature L6r of the image-side surface of the sixth lens L6, which is the most image-side surface of the imaging lens L, does not become excessively large relative to the paraxial image height (f·tan ω), and this preferably allows correction of field curvature while achieving reduction of the entire length of the lens. It should be noted that, in the case where the sixth lens L6 has an aspheric shape including a concave surface toward the image side and at least one inflection point, as shown by the imaging lens L of each embodiment, and the lower limit of the condition expression (8) is satisfied, successful correction of field curvature can be achieved throughout from the central angle of view to the peripheral angle of view, and this facilitates achieving an imaging lens with a wide angle of view. On the other hand, when the ratio does not become greater than or equal to the upper limit of the condition expression (8), the absolute value of the paraxial radius of curvature L6r of the image-side surface of the sixth lens L6, which is the most image-side surface of the imaging lens L, does not become excessively small relative to the paraxial image height (f·tan ω), and this allows suppressing increase of the incidence angle of rays traveling through the optical system on the image plane (the image sensor), in particular, at an intermediate angle of view. In order to enhance this effect, it is preferred that the condition expression (8-1) below be satisfied:

$$1 < f \cdot \tan \omega / L6r < 5 \quad (8\text{-}1).$$

Further, it is preferred that paraxial radius of curvature L1f of the object-side surface of the first lens L1 and paraxial radius of curvature L1r of the image-side surface of the first lens L1 satisfy the condition expression (9) below:

$$0.5 < (L1r + L1f)/(L1r - L1f) < 1 \quad (9).$$

The condition expression (9) defines a preferred numerical range about the paraxial radius of curvature L1f of the object-side surface of the first lens L1 and the paraxial radius of curvature L1r of the image-side surface of the first lens L1. Setting the paraxial radius of curvatures of the object-side surface and the image-side surface of the first lens L1 such that the ratio shown above does not become smaller than or equal to the lower limit of the condition expression (9) is advantageous for correction of spherical aberration. On the other hand, setting the paraxial radius of curvatures of the object-side surface and the image-side surface of the first lens L1 such that the ratio shown above does not become greater than or equal to the upper limit of the condition expression (9) is advantageous for reduction of the entire length.

The imaging lens according to the embodiments of the invention can achieve even higher imaging performance by satisfying the above-described preferred conditions as appropriate. The imaging device according to the embodiments of the invention outputs an imaging signal according to an optical image formed by the high-performance imaging lens of the embodiments of the invention, and therefore can capture a high-resolution image with a wide angle of view while the size of the device is shortened.

Next, specific numerical examples of the imaging lens according to the embodiments of the invention are described. In the following description, several numerical examples are explained at once.

Tables 1 and 2 presented below show specific lens data corresponding to the configuration of the imaging lens shown in FIG. 1. Specifically, Table 1 shows basic lens data, and Table 2 shows data about aspheric surfaces. The lens data shown in Table 1 is the lens data about the imaging lens according to Example 1, and each value in the column of surface number "Si" is the surface number of the i-th surface, where the object-side surface of the most object-side optical element is the 1st surface and the number is sequentially increased toward the image side. Each value in the column of radius of curvature "Ri", which corresponds to each symbol "Ri" shown in FIG. 1, is the value (mm) of radius of curvature of the i-th surface from the object side. Each value in the column of surface distance "Di" is the surface distance (mm) between the i-th surface Si and the i+1-th surface Si+1 from the object side along the optical axis. Each value in the column of "Ndj" is the value of refractive index with respect to the d-line (the wavelength of 587.6 nm) of the j-th optical element from the object side. Each value in the column of "vdj" is the value of Abbe number with respect to the d-line of the j-th optical element from the object side.

Table 1 also includes data about the aperture stop St and the optical member CG. In the column of surface number in Table 1, the surface number and the text "(St)" are shown at the position of the surface corresponding to the aperture stop St, and the surface number and the text "(IMG)" are shown at the position of the surface corresponding to the image plane. The sign (positive or negative) with respect to the radius of curvature means that a surface shape that is convex toward the object side is positive and a surface shape that is convex toward the image side is negative. Further, as other data, values of the focal length f of the entire system (mm), the back focus Bf (mm), the f-number Fno., and the total angle of view 2ω (°) are shown above the frame of the table of each lens data. It should be noted that the value of the back focus Bf is an equivalent air distance.

In the basic lens data shown in Table 1, each aspheric surface is indicated by the symbol "*" added to the surface number thereof. Each of the first to the sixth lenses L1 to L6 of the imaging lens according to Example 1 has aspheric surfaces on both sides. The value of radius of curvature of each aspheric surface in the basic lens data shown in Table 1 is a value of radius of curvature in the vicinity of the optical axis (paraxial radius of curvature).

Table 2 shows aspheric surface data of the imaging lens of Example 1. In each value shown as the aspheric surface data, the symbol "E" means that the numerical value following the symbol "E" is an exponent with the base being 10, and that the numerical value before the symbol "E" is multiplied by the numerical value represented by the exponential function with the base being 10. For example, "1.0 E-02" means "$1.0 \times 10^{-2}$".

As the aspheric surface data, values of coefficients An and KA in the formula of aspheric shape which is expressed as the formula (A) below are shown. More specifically, Z represents a length (mm) of a perpendicular line from a point on the aspheric surface, which point is at a height h from the optical axis, to a plane (a plane perpendicular to the optical axis) tangential to the apex of the aspheric surface.

$$Z = \frac{C \times h^2}{1 + \sqrt{1 - KA \times C^2 \times h^2}} + \sum_n An \times h^n \quad (A)$$

where Z is a depth (mm) of the aspheric surface, h is a distance (mm) from the optical axis to the lens surface (height), C is a paraxial curvature=1/R (where R is a paraxial radius of curvature), An is an n-th order (where n is an integer of 3 or more) aspheric coefficient, and KA is an aspheric coefficient.

Similarly to the lens data of the imaging lens of Example 1, specific lens data corresponding to the configurations of imaging lenses shown in FIGS. 2 to 5 are shown as Examples 2 to 5 in Tables 3 to 10. In the imaging lenses according to Examples 1 to 5, each of the first to the sixth lenses L1 to L6 has aspheric surfaces on both sides.

Figure 7:
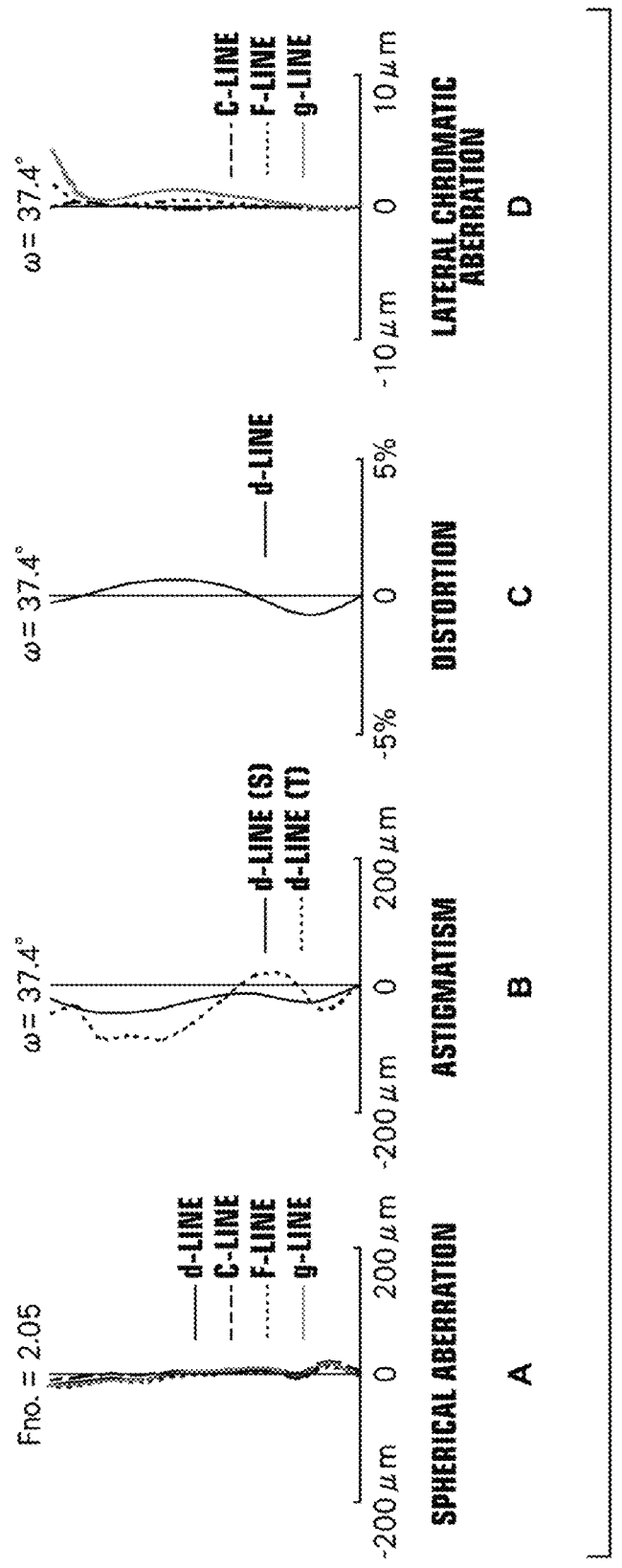
FIG. 7 is an aberration diagram showing various aberrations of the imaging lens according to Example 1 of the invention, where spherical aberration is shown at "A", astigmatism is shown at "B", distortion is shown at "C", and lateral chromatic aberration is shown at "D"
Figure 8:
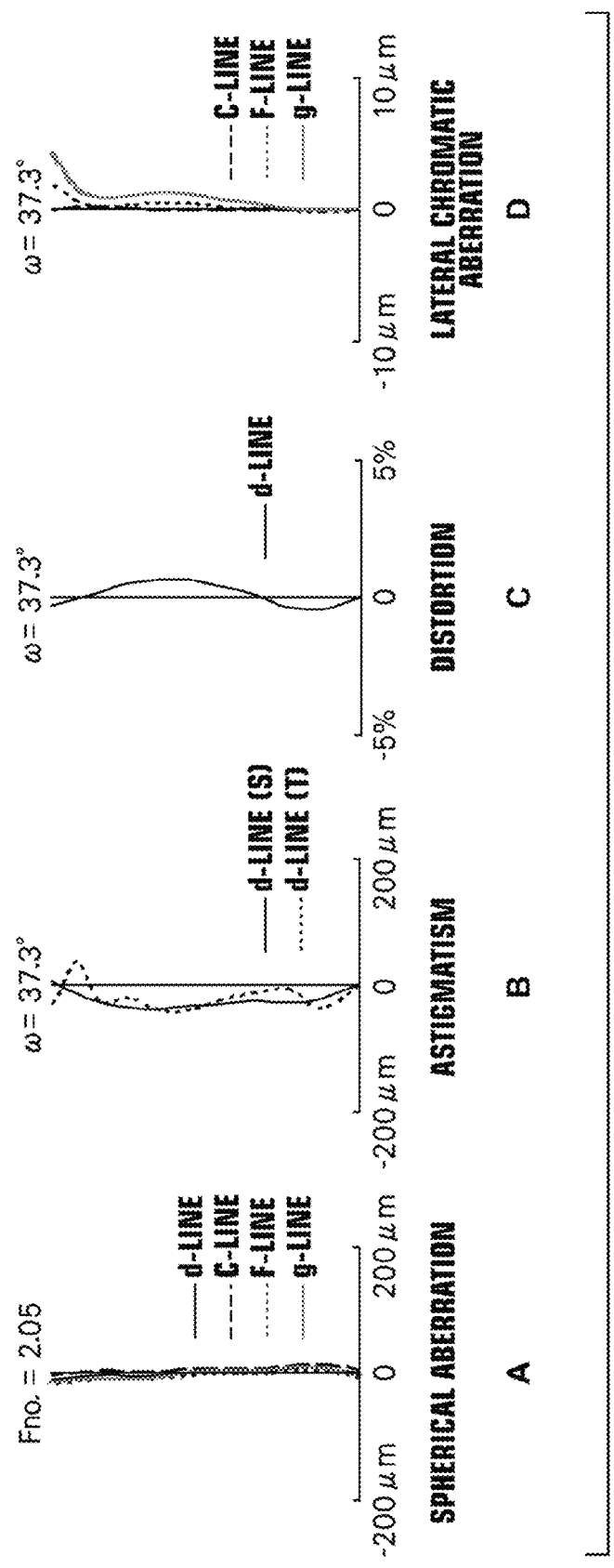
FIG. 8 is an aberration diagram showing various aberrations of the imaging lens according to Example 2 of the invention, where spherical aberration is shown at "A", astigmatism is shown at "B", distortion is shown at "C", and lateral chromatic aberration is shown at "D"
Figure 9:
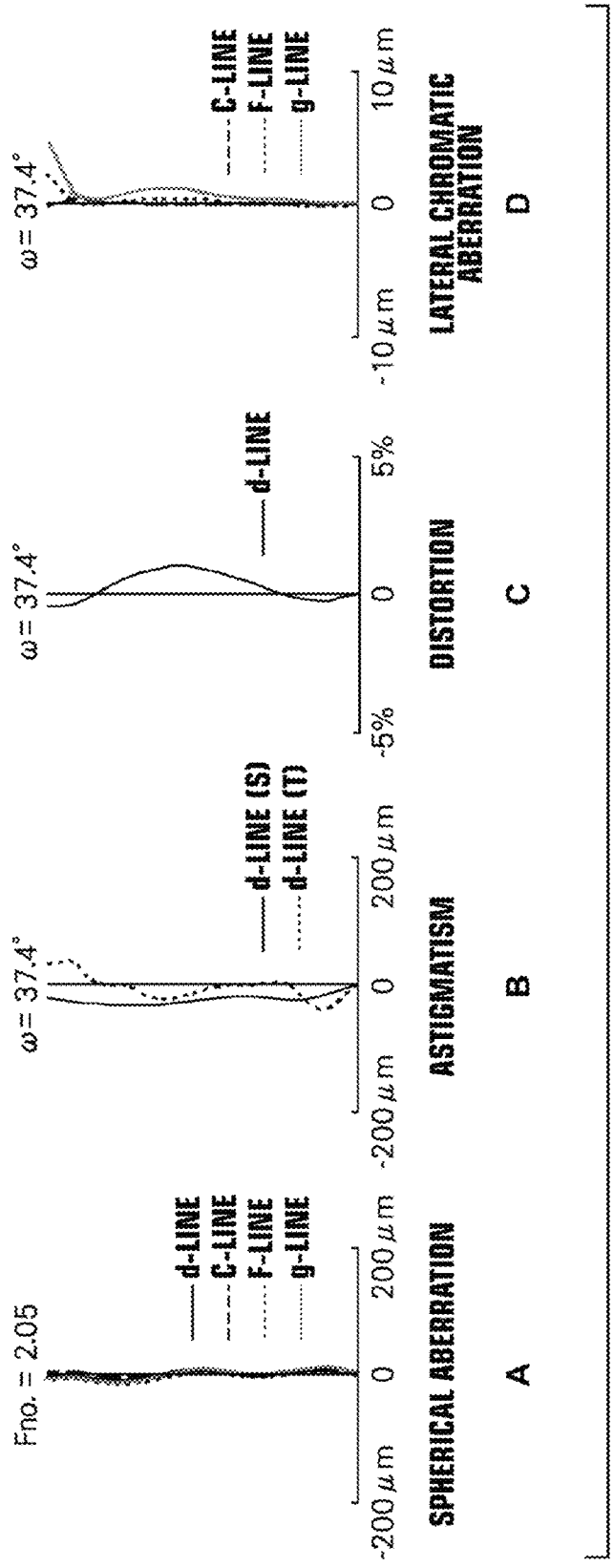
FIG. 9 is an aberration diagram showing various aberrations of the imaging lens according to Example 3 of the invention, where spherical aberration is shown at "A", astigmatism is shown at "B", distortion is shown at "C", and lateral chromatic aberration is shown at "D"
Figure 10:
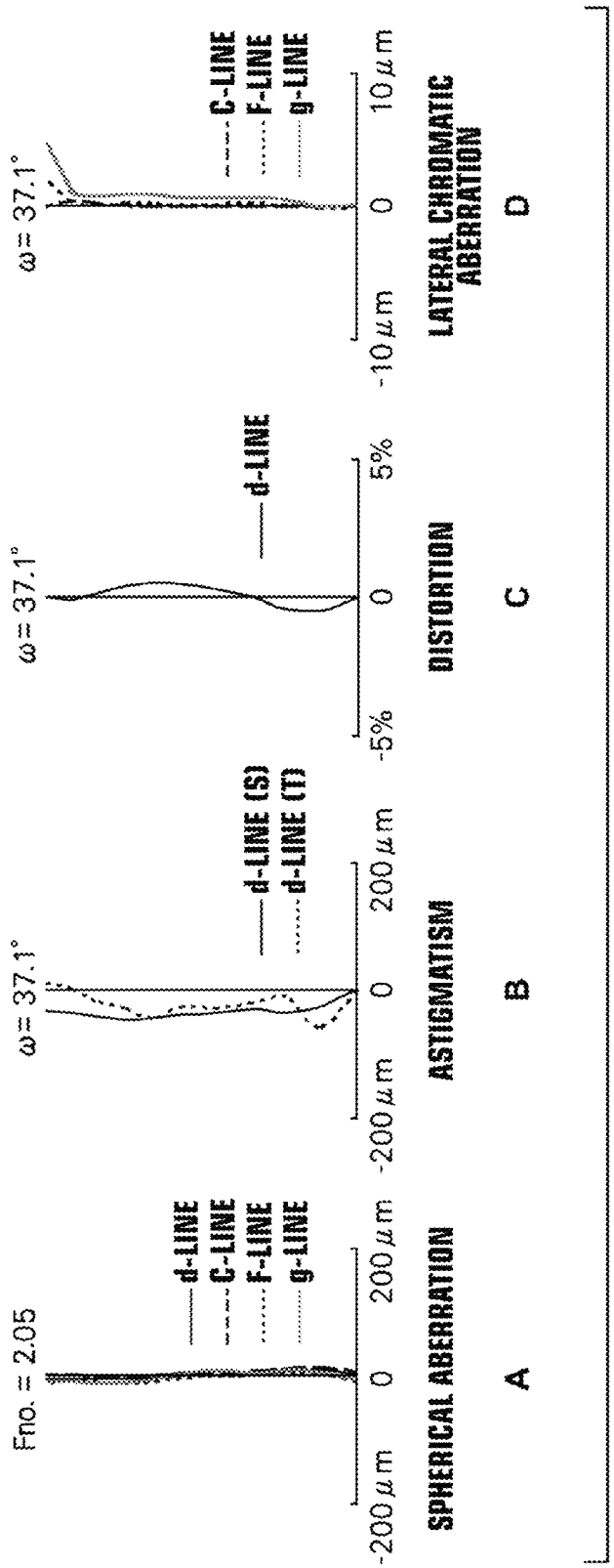
FIG. 10 is an aberration diagram showing various aberrations of the imaging lens according to Example 4 of the invention, where spherical aberration is shown at "A", astigmatism is shown at "B", distortion is shown at "C", and lateral chromatic aberration is shown at "D"
Figure 11:
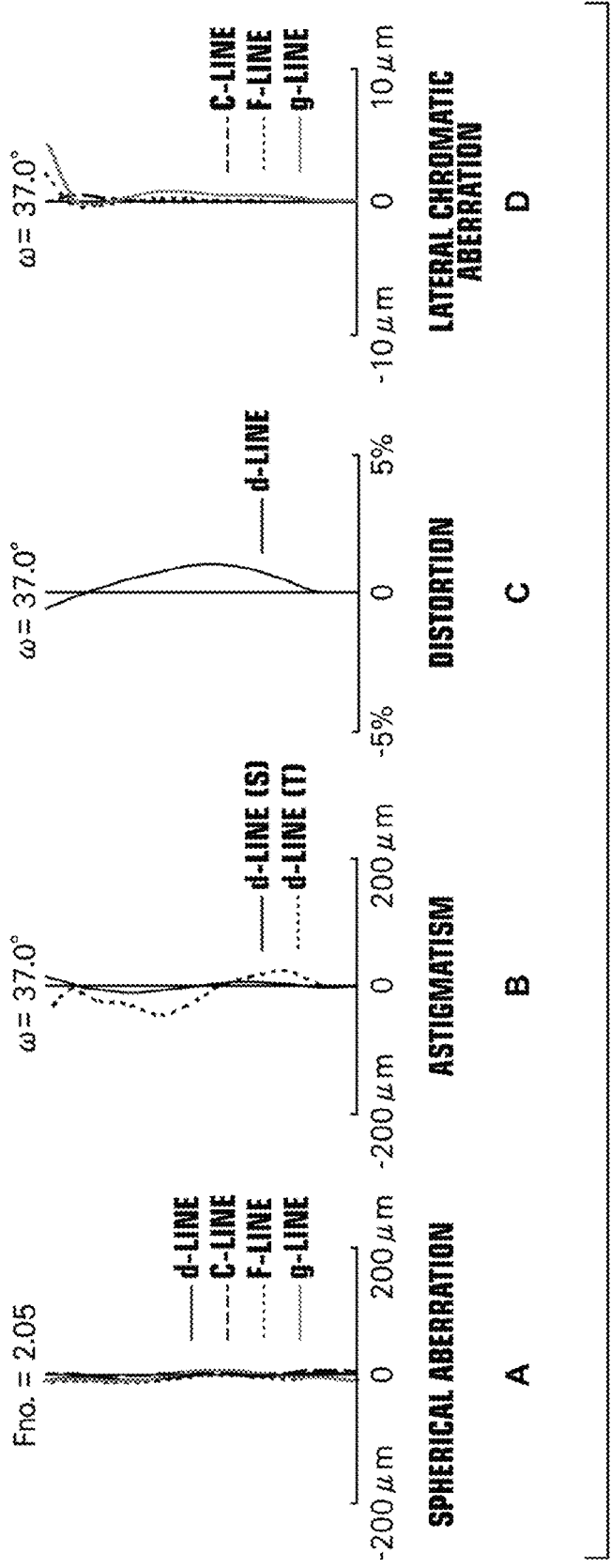
FIG. 11 is an aberration diagram showing various aberrations of the imaging lens according to Example 5 of the invention, where spherical aberration is shown at "A", astigmatism is shown at "B", distortion is shown at "C", and lateral chromatic aberration is shown at "D"

FIG. 7 shows, at "A" to "D", aberration diagrams of spherical aberration, astigmatism, distortion, and lateral chromatic aberration (chromatic aberration of magnification), respectively, of the imaging lens of Example 1. Each aberration shown in the aberration diagrams of spherical aberration, astigmatism (field curvature), and distortion is with respect to the d-line (the wavelength of 587.6 nm), which is used as the reference wavelength. The aberration diagram of spherical aberration also shows the aberrations with respect to the F-line (the wavelength of 486.1 nm), the C-line (the wavelength of 656.3 nm), and the g-line (the wavelength of 435.8 nm), and the aberration diagram of lateral chromatic aberration shows the aberrations with respect to the F-line, the C-line and the g-line. In the aberration diagram of astigmatism, the aberration in the sagittal direction (S) is shown in the solid line and the aberration in the tangential direction (T) is shown in the dotted line. The symbol "Fno." means "F-number" and the symbol "ω" means "half angle of view".

Similarly, the various aberrations of the imaging lenses of Examples 2 to 5 are shown at "A" to "D" in FIGS. 8 to 11. The aberration diagrams shown at "A" to "D" in FIGS. 7 to 11 are of cases where the object distance is infinity.

Further, Table 11 shows values corresponding to the above-described condition expressions (1) to (9) for each of Examples 1 to 5.

It should be noted that the numerical values shown in each table are rounded at predetermined decimal places. The unit of the values of angle is degrees and the unit of the values of length is millimeters; however, this is only one example, and any other suitable units may be used since optical systems are usable when they are proportionally enlarged or reduced.

As can be seen from the numerical data and the aberration diagrams, all the imaging lenses of Examples 1 to 5 have a total angle of view of 74° or more, i.e., achieve wide angle of view, and have successfully corrected aberrations and high imaging performance throughout from the central angle of view to the peripheral angle of view while achieving reduction of the entire length.

While the present invention has been described with reference to the embodiments and the examples, the imaging lens of the invention is not limited to the above-described embodiments and examples, and various medications may be made to the invention. For example, the values of the radius of curvature, the surface distance, the refractive index, the Abbe number, the aspheric coefficients, etc., of each lens are not limited to the values shown in the numerical examples and may take different values.

Further, while the imaging lenses of the above-described examples are described on the assumption that they are used as fixed-focus lenses, the imaging lens of the invention can be configured to allow focusing. For example, a configuration that allows automatic focusing can be achieved by moving the entire lens system or moving part of the lenses forming the lens system along the optical axis.

TABLE 1

Example 1
f = 4.041, Bf = 1.097, Fno. = 2.05, 2ω = 74.8

| Si | Ri | Di | Ndj | vdj |
|---|---|---|---|---|
| 1(St) | ∞ | −0.125 | | |
| *2 | 1.88325 | 0.574 | 1.54488 | 54.87 |
| *3 | −20.10153 | 0.081 | | |
| *4 | 4.61352 | 0.261 | 1.63350 | 23.62 |
| *5 | 1.81648 | 0.293 | | |
| *6 | 6.00253 | 0.509 | 1.54488 | 54.87 |
| *7 | −21.90060 | 0.361 | | |
| *8 | −4.07894 | 0.351 | 1.54488 | 54.87 |
| *9 | −1.26791 | 0.061 | | |
| *10 | −1.08369 | 0.272 | 1.63350 | 23.62 |
| *11 | −1.22296 | 0.397 | | |
| *12 | −25.31657 | 0.463 | 1.54488 | 54.87 |
| *13 | 1.46627 | 0.400 | | |
| 14 | ∞ | 0.210 | 1.51633 | 64.14 |
| 15 | ∞ | 0.559 | | |
| 16(IMG) | ∞ | | | |

TABLE 2

Example 1

| Surface No. | 2 | 5 | 8 | 11 |
|---|---|---|---|---|
| KA | 1.4315328E+00 | −7.1864071E+00 | −3.9734835E+02 | −1.6774418E−02 |
| A3 | 0.0000000E+00 | 0.0000000E+00 | 0.0000000E+00 | 0.0000000E+00 |
| A4 | −3.9829163E−02 | −1.0720313E−01 | −8.5238682E−01 | 2.6836145E−01 |
| A5 | 1.2638668E−01 | 1.3785060E−01 | −7.0235412E−01 | 2.9411492E−01 |
| A6 | −5.9067618E−01 | 1.8874254E−01 | 1.9728830E+01 | −5.3494194E−01 |
| A7 | 1.7711601E+00 | −1.1751827E−01 | −8.1879483E+01 | −2.1191873E−01 |
| A8 | −3.2412623E+00 | −1.6824347E−01 | 1.7096699E+02 | 4.1108092E−02 |
| A9 | 3.1593905E+00 | −3.4857466E−02 | −1.7257458E+02 | 9.4557297E−01 |
| A10 | −1.7064670E−01 | 8.1265694E−02 | −2.6149830E+01 | −1.1236986E+00 |
| A11 | −5.0124329E+00 | 1.0468305E−01 | 3.1935976E+02 | 7.6208517E−01 |
| A12 | 9.0392629E+00 | 8.2317886E−02 | −4.3157651E+02 | −4.7204658E−01 |
| A13 | −7.9684589E+00 | −2.1249246E−01 | 2.8277191E+02 | 2.2852131E−01 |
| A14 | 3.2290400E+00 | 5.1000215E−03 | −8.3626005E+01 | −6.1638070E−02 |
| A15 | −2.0144757E−01 | 8.9737208E−02 | 6.0092929E−01 | 6.3795155E−03 |
| A16 | −1.4918322E−01 | −2.8802425E−02 | 3.7221551E+00 | 8.7381827E−05 |

TABLE 2-continued

Example 1

| Surface No. | 3 | 6 | 9 | 12 |
|---|---|---|---|---|
| KA | 8.7746683E+01 | 1.2521251E+01 | 8.0376525E-01 | 9.9406339E+00 |
| A3 | 0.0000000E+00 | 0.0000000E+00 | 0.0000000E+00 | 0.0000000E+00 |
| A4 | 8.4323714E-01 | -2.3581711E-01 | -4.6200743E-01 | -1.4474542E-01 |
| A5 | -1.6509946E+01 | 6.8514143E-01 | 3.0825281E+00 | 2.5917588E-02 |
| A6 | 1.2248872E+02 | -1.8325743E+00 | -5.3690644E+00 | -1.7514820E-03 |
| A7 | -4.8987404E+02 | 2.6661773E+00 | 3.7508008E+00 | 9.8292207E-03 |
| A8 | 1.1219125E+03 | -2.0039046E+00 | -2.2397884E+00 | 5.0011676E-03 |
| A9 | -1.3438062E+03 | 1.6095467E+00 | 1.2185132E+00 | -1.6648813E-03 |
| A10 | 3.4871903E+02 | -2.3260381E+00 | 7.7256039E+00 | -1.2826884E-04 |
| A11 | 9.9973053E+02 | -3.7652310E+00 | -1.6902509E+01 | -8.2852675E-05 |
| A12 | -6.7979974E+02 | 1.7823958E+01 | 1.1534816E+01 | -6.7853784E-05 |
| A13 | -1.0675739E+03 | -2.2302686E+01 | 3.6633095E-01 | -5.7307955E-05 |
| A14 | 1.8343142E+03 | 1.1477200E+01 | -4.2101042E+00 | -1.8489791E-05 |
| A15 | -1.0512754E+03 | -1.6225406E+00 | 1.9026323E+00 | 3.8833324E-05 |
| A16 | 2.2078842E+02 | -3.0046753E-01 | -2.5413382E-01 | -7.8563619E-06 |

| Surface No. | 4 | 7 | 10 | 13 |
|---|---|---|---|---|
| KA | -2.1412933E+01 | -7.1859143E+00 | -2.9558256E+00 | -5.6461100E+00 |
| A3 | 0.0000000E+00 | 0.0000000E+00 | 0.0000000E+00 | 0.0000000E+00 |
| A4 | -2.4937579E-01 | -2.3153051E-01 | -2.1434784E-01 | -2.0851127E-01 |
| A5 | 3.3484589E-02 | 6.2061490E-01 | 1.7569563E-01 | 1.9463151E-01 |
| A6 | 8.2089237E-01 | -3.8122110E-01 | -2.3518987E+00 | -8.4590629E-02 |
| A7 | -9.6886387E-01 | -4.1474333E+00 | 5.0164700E-01 | 1.0854537E-02 |
| A8 | 1.4187058E+00 | 1.1810092E+01 | -1.4247877E+00 | 5.0576899E-03 |
| A9 | -2.5055281E+00 | -1.3341720E+01 | 2.7617469E+00 | -1.4667057E-03 |
| A10 | 7.9481198E-01 | 7.7428966E+00 | 2.7369257E+00 | -5.5027531E-04 |
| A11 | 4.1543888E-01 | -7.8280758E+00 | -7.2571548E+00 | 2.4256689E-04 |
| A12 | 2.5422679E+00 | 1.3340039E+00 | 3.2302403E+00 | 5.9675855E-05 |
| A13 | -2.4754147E+00 | -1.2025306E+01 | 1.6810086E+00 | -7.9412367E-05 |
| A14 | -1.5545428E+00 | 5.3979324E+00 | -1.8750999E+00 | 3.1471544E-05 |
| A15 | 2.2189748E+00 | -1.3161051E+00 | 5.4062700E-01 | -6.1211152E-06 |
| A16 | -5.4400392E-01 | 1.8575846E-01 | -4.4973812E-02 | 4.8476518E-07 |

TABLE 3

Example 2
f = 4.056, Bf = 1.106, Fno. = 2.05, 2ω = 74.6

| Si | Ri | Di | Ndj | νdj |
|---|---|---|---|---|
| 1(St) | ∞ | -0.125 | | |
| *2 | 1.83492 | 0.592 | 1.54488 | 54.87 |
| *3 | -25.24557 | 0.068 | | |
| *4 | 4.55090 | 0.261 | 1.63350 | 23.62 |
| *5 | 1.81762 | 0.328 | | |
| *6 | 4.95919 | 0.472 | 1.54488 | 54.87 |
| *7 | 20.00628 | 0.328 | | |
| *8 | -4.12899 | 0.364 | 1.54488 | 54.87 |
| *9 | -1.23398 | 0.062 | | |
| *10 | -1.12774 | 0.262 | 1.63350 | 23.62 |
| *11 | -1.26964 | 0.432 | | |
| *12 | -25.52587 | 0.445 | 1.54488 | 54.87 |
| *13 | 1.53372 | 0.400 | | |
| 14 | ∞ | 0.210 | 1.51633 | 64.14 |
| 15 | ∞ | 0.567 | | |
| 16(IMG) | ∞ | | | |

TABLE 4

Example 2

| Surface No. | 2 | 5 | 8 | 11 |
|---|---|---|---|---|
| KA | 1.4467392E+00 | -7.1961004E+00 | -2.8855226E+02 | 4.1990751E-02 |
| A3 | 0.0000000E+00 | 0.0000000E+00 | 0.0000000E+00 | 0.0000000E+00 |
| A4 | -3.8943224E-02 | -1.2584634E-01 | -8.8365184E-01 | 2.3726578E-01 |
| A5 | 1.3994700E-01 | 1.5404573E-01 | 1.8300354E+00 | 2.9802902E-01 |
| A6 | -5.5072060E-01 | 2.4103968E-01 | -3.3215545E-01 | -4.7355517E-01 |
| A7 | 1.2265773E+00 | -8.6278585E-02 | -4.7867180E+00 | -3.0939274E-01 |
| A8 | -1.6160312E+00 | -2.2864120E-01 | 5.6894264E+00 | 2.3236916E-01 |
| A9 | 8.9819414E-01 | -5.7780941E-01 | 2.3013927E+00 | 5.7257965E-01 |
| A10 | 6.1053294E-01 | 1.5280984E+00 | -5.4334338E+00 | -6.5065633E-01 |
| A11 | -1.2986121E+00 | -9.5076015E-01 | -1.6116062E+00 | 4.0589190E-01 |
| A12 | 7.2414677E-02 | -1.4672111E+00 | 2.4539803E+00 | -3.3046994E-01 |
| A13 | 1.7158505E+00 | 4.1344726E+00 | 2.4124379E+00 | 2.1581691E-01 |
| A14 | -1.8827576E+00 | -4.3797962E+00 | -8.2087823E-01 | -7.4279121E-02 |
| A15 | 7.4608150E-01 | 2.2543529E+00 | -1.8875790E+00 | 1.1572000E-02 |
| A16 | -7.2487223E-02 | -4.6404218E-01 | 8.7409830E-01 | -5.6932469E-04 |

TABLE 4-continued

Example 2

| Surface No. | 3 | 6 | 9 | 12 |
|---|---|---|---|---|
| KA | −7.6600213E+00 | 1.2037596E+01 | 7.1974546E−01 | 9.9997264E+00 |
| A3 | 0.0000000E+00 | 0.0000000E+00 | 0.0000000E+00 | 0.0000000E+00 |
| A4 | −8.9764909E−02 | −2.5152312E−01 | −4.3897036E−01 | −1.5022804E−01 |
| A5 | −1.0602546E−01 | 5.8075010E−01 | 2.8035910E+00 | 3.9562320E−02 |
| A6 | −1.4527720E+00 | −1.4413213E+00 | −3.5582531E+00 | 4.7996412E−03 |
| A7 | 1.1542032E+01 | 1.3697574E+00 | −2.3154184E+00 | 4.1815478E−03 |
| A8 | −2.6573100E+01 | 1.6918167E+00 | 7.4525563E+00 | −1.5078215E−03 |
| A9 | 2.2119958E+01 | −5.1247514E+00 | −2.3720636E+00 | 1.2748726E−04 |
| A10 | 6.5775008E+00 | 3.1736032E+00 | −3.1109853E+00 | 1.0054042E−03 |
| A11 | −1.9501854E+01 | 2.5395234E−01 | −7.0911478E−01 | 6.5006060E−04 |
| A12 | 1.3874847E−01 | 1.7096722E+00 | 5.3417660E+00 | −8.3213522E−04 |
| A13 | 1.2218752E+01 | −2.5501053E+00 | −3.5181668E+00 | 8.4110837E−05 |
| A14 | −2.0679942E+00 | −1.5689032E+00 | 1.6789235E−01 | −2.0085598E−05 |
| A15 | −4.8566952E+00 | 2.9913958E+00 | 5.4600042E−01 | 4.1376860E−05 |
| A16 | 2.0034241E+00 | −9.8101571E−01 | −1.4167484E−01 | −8.6133200E−06 |

| Surface No. | 4 | 7 | 10 | 13 |
|---|---|---|---|---|
| KA | −2.2363096E+01 | −1.5364657E+01 | −2.8783606E+00 | −5.6618685E+00 |
| A3 | 0.0000000E+00 | 0.0000000E+00 | 0.0000000E+00 | 0.0000000E+00 |
| A4 | −2.8609278E−01 | −2.3955984E−01 | −1.6069154E−01 | −2.1870816E−01 |
| A5 | 6.7655143E−02 | 6.3758944E−01 | 1.3945501E+00 | 2.1035878E−01 |
| A6 | 7.1530896E−01 | −8.9155919E−01 | −9.0169976E−01 | −8.9366587E−02 |
| A7 | −3.6090152E+00 | −1.9723998E+00 | −3.3642888E+00 | 3.0710304E−03 |
| A8 | 2.3674408E−01 | 7.5300226E+00 | 4.2546084E+00 | 1.5166199E−02 |
| A9 | −4.5163318E+00 | −8.7873304E+00 | 3.3088750E−01 | −7.7793413E−03 |
| A10 | 7.0821581E+00 | 4.7732648E+00 | −2.0767695E+00 | 1.7625180E−03 |
| A11 | −4.8568945E+00 | −4.6230522E+00 | 2.4505719E+00 | −2.8745639E−04 |
| A12 | 1.9520487E−01 | 6.0236686E+00 | 4.9640765E−01 | 2.9292969E−04 |
| A13 | 9.2448952E+00 | −1.1011868E+00 | −6.0060685E−01 | −2.6502137E−04 |
| A14 | −1.6947004E+01 | −3.5758701E+00 | 8.3018050E−01 | 1.1453377E−04 |
| A15 | 1.2208247E+01 | 2.5264034E+00 | −5.1412114E−01 | −2.4209570E−05 |
| A16 | −3.1515871E+00 | −4.8913677E−01 | 1.0653191E−01 | 2.0413745E−06 |

TABLE 5

Example 3
f = 4.041, Bf = 1.094, Fno. = 2.05, 2ω = 74.8

| Si | Ri | Di | Ndj | νdj |
|---|---|---|---|---|
| 1(St) | ∞ | −0.125 | | |
| *2 | 1.76608 | 0.598 | 1.54488 | 54.87 |
| *3 | −26.63617 | 0.125 | | |
| *4 | −25.03784 | 0.252 | 1.63350 | 23.62 |
| *5 | 3.44253 | 0.228 | | |
| *6 | 5.81716 | 0.475 | 1.54488 | 54.87 |
| *7 | −44.71098 | 0.388 | | |
| *8 | −3.39412 | 0.367 | 1.54488 | 54.87 |
| *9 | −1.18132 | 0.072 | | |
| *10 | −1.23135 | 0.309 | 1.63350 | 23.62 |
| *11 | −1.39140 | 0.380 | | |
| *12 | −26.18018 | 0.434 | 1.54488 | 54.87 |
| *13 | 1.42358 | 0.400 | | |
| 14 | ∞ | 0.210 | 1.51633 | 64.14 |
| 15 | ∞ | 0.555 | | |
| 16(IMG) | ∞ | | | |

TABLE 6

Example 3

| Surface No. | 2 | 5 | 8 | 11 |
|---|---|---|---|---|
| KA | 8.6519324E−01 | −7.2131765E+00 | −2.8600852E+02 | 2.2321477E−01 |
| A3 | 0.0000000E+00 | 0.0000000E+00 | 0.0000000E+00 | 0.0000000E+00 |
| A4 | −2.3666956E−02 | −9.7499939E−02 | −1.0393553E+00 | 2.4897502E−01 |
| A5 | 7.1780499E−02 | 9.9974046E−02 | 1.4199602E+00 | 2.7157188E−01 |
| A6 | −2.2549950E−01 | 2.6005238E−01 | 1.8332498E+00 | −4.5125878E−01 |
| A7 | 2.9486657E−01 | −1.0346600E−01 | −4.7135945E+00 | −5.8254259E−01 |
| A8 | 6.0310480E−01 | −3.4377695E−01 | −1.9300406E+00 | 8.3771783E−01 |
| A9 | −2.9451664E+00 | 1.0003539E−01 | 8.2555882E+00 | −1.4431005E−01 |
| A10 | 3.9452594E+00 | 5.0383321E−02 | −5.3020117E−01 | 7.6361531E−03 |
| A11 | −7.0550508E−01 | 3.8445223E−01 | −4.4606834E+00 | −1.1882101E−01 |
| A12 | −3.7696809E+00 | −2.5998297E−01 | −2.1415539E+00 | 8.9281099E−03 |
| A13 | 4.5444978E+00 | −3.1132285E−01 | −1.5666327E+00 | 4.8932744E−02 |
| A14 | −2.2106245E+00 | 3.9874229E−01 | 1.2923189E+01 | −1.5180646E−02 |

TABLE 6-continued

Example 3

| | | | | |
|---|---|---|---|---|
| A15 | 3.0160275E−01 | −1.6477350E−01 | −1.1156254E+01 | −1.7210762E−03 |
| A16 | 7.8841914E−02 | 2.7250690E−02 | 2.8966349E+00 | 8.1909496E−04 |

| Surface No. | 3 | 6 | 9 | 12 |
|---|---|---|---|---|
| KA | 7.9335908E+00 | 1.4335457E+01 | 5.7741731E−01 | 8.7413133E+00 |
| A3 | 0.0000000E+00 | 0.0000000E+00 | 0.0000000E+00 | 0.0000000E+00 |
| A4 | 7.0305816E−02 | −2.4607214E−01 | −2.8476765E−01 | −2.1544704E−01 |
| A5 | −1.0369969E+00 | 5.9416433E−01 | 1.9951457E+00 | 1.2571135E−01 |
| A6 | 5.6390125E+00 | −1.8335772E+00 | −1.9491678E+00 | −1.5226288E−03 |
| A7 | −2.3372024E+01 | 3.3037769E+00 | −1.5356965E+00 | −8.2153944E−02 |
| A8 | 7.3681513E+01 | −3.0201529E+00 | 1.5654047E+00 | 4.3814220E−02 |
| A9 | −1.5606966E+02 | 5.9829236E−01 | 1.3235902E+00 | 1.4530883E−02 |
| A10 | 1.9843029E+02 | 2.5676743E+00 | 5.6882826E−01 | −3.3565899E−03 |
| A11 | −1.1661726E+02 | −8.3478769E+00 | −2.4805178E+00 | −8.7076341E−03 |
| A12 | −2.9588952E+01 | 1.3803900E+01 | 4.1267019E−01 | 3.7870761E−03 |
| A13 | 8.7649862E+01 | −8.8193788E+00 | 4.8390444E−01 | −7.8475933E−04 |
| A14 | −4.3399326E+01 | −2.1369379E+00 | 4.1582551E−01 | 3.7275244E−04 |
| A15 | 1.7287572E+00 | 4.9887823E+00 | −5.1610315E−01 | −1.2756500E−04 |
| A16 | 2.8290813E+00 | −1.6117487E+00 | 1.2726428E−01 | 1.4435124E−05 |

| Surface No. | 4 | 7 | 10 | 13 |
|---|---|---|---|---|
| KA | −2.2081920E+03 | −2.3818588E+01 | −3.2176209E+00 | −4.9501909E+00 |
| A3 | 0.0000000E+00 | 0.0000000E+00 | 0.0000000E+00 | 0.0000000E+00 |
| A4 | −1.2216887E−01 | −2.7078403E−01 | −2.8598762E−01 | −2.7461297E−01 |
| A5 | 1.1624775E−01 | 7.8095009E−01 | 2.2737947E+00 | 3.0346411E−01 |
| A6 | 6.9566819E−01 | −8.3304430E−01 | −2.7810116E+00 | −1.6311930E−01 |
| A7 | −3.1781047E+00 | −2.2172647E+00 | −9.3047127E−01 | 5.3015073E−02 |
| A8 | 7.7485995E+00 | 4.8898690E+00 | 4.3573922E−02 | −3.0092645E−02 |
| A9 | −9.3845810E+00 | 1.2725475E+00 | 6.0766756E+00 | 2.8234074E−02 |
| A10 | 3.3690798E+00 | −1.0553059E+01 | −5.3402337E+00 | −1.6635524E−02 |
| A11 | 2.5160516E+00 | 6.4839793E+00 | 1.4510747E−01 | 5.8263303E−03 |
| A12 | −3.5020876E+00 | 5.9533886E+00 | −1.1997976E−01 | −1.5551159E−03 |
| A13 | 5.6869631E+00 | −9.8832987E+00 | 2.6591917E+00 | 4.9603147E−04 |
| A14 | −6.5776279E+00 | 5.9302768E+00 | −2.6746561E+00 | −1.6476808E−04 |
| A15 | 2.7293208E+00 | −2.1599897E+00 | 1.1513110E+00 | 3.4136688E−05 |
| A16 | −1.0083440E−01 | 4.2951818E−01 | −2.0355828E−01 | −2.9612422E−06 |

TABLE 7

Example 4
f = 4.069, Bf = 1.101, Fno. = 2.05, 2ω = 74.2

| Si | Ri | Di | Ndj | νdj |
|---|---|---|---|---|
| 1(St) | ∞ | −0.125 | | |
| *2 | 1.80741 | 0.610 | 1.54488 | 54.87 |
| *3 | −13.86218 | 0.040 | | |
| *4 | 5.07267 | 0.262 | 1.63350 | 23.62 |
| *5 | 1.96797 | 0.349 | | |
| *6 | −33.12928 | 0.493 | 1.54488 | 54.87 |
| *7 | −6.57320 | 0.379 | | |
| *8 | −4.00517 | 0.366 | 1.54488 | 54.87 |
| *9 | −1.22009 | 0.079 | | |

TABLE 7-continued

Example 4
f = 4.069, Bf = 1.101, Fno. = 2.05, 2ω = 74.2

| Si | Ri | Di | Ndj | νdj |
|---|---|---|---|---|
| *10 | −1.13212 | 0.274 | 1.63350 | 23.62 |
| *11 | −1.27687 | 0.437 | | |
| *12 | −25.41155 | 0.331 | 1.54488 | 54.87 |
| *13 | 1.43138 | 0.400 | | |
| 14 | ∞ | 0.210 | 1.51633 | 64.14 |
| 15 | ∞ | 0.562 | | |
| 16(IMG) | ∞ | | | |

TABLE 8

Example 4

| Surface No. | 2 | 5 | 8 | 11 |
|---|---|---|---|---|
| KA | 1.3324041E+00 | −7.2020963E+00 | −3.7140561E+02 | 1.2129224E−01 |
| A3 | 0.0000000E+00 | 0.0000000E+00 | 0.0000000E+00 | 0.0000000E+00 |
| A4 | −4.3748326E−02 | −8.7730589E−02 | −1.0458957E+00 | 3.3038445E−01 |
| A5 | 1.9506392E−01 | 1.2283845E−01 | 2.0763937E+00 | −1.0323002E+00 |
| A6 | −8.5927864E−01 | 1.7000503E−01 | −1.3413463E+00 | 5.7714932E+00 |
| A7 | 2.5378065E+00 | −9.6272591E−02 | 2.5157571E+00 | −1.6171270E+01 |
| A8 | −4.7457177E+00 | −1.3576672E−01 | −1.0954105E+01 | 2.3257602E+01 |
| A9 | 4.7416784E+00 | −8.1002899E−02 | 1.3436305E+01 | −1.5936754E+01 |
| A10 | −3.4609685E−01 | 8.2194979E−02 | 3.6302573E+00 | −1.5755908E+00 |
| A11 | −5.7474070E+00 | 2.4960161E−01 | −1.5108949E+01 | 1.2803220E+01 |
| A12 | 7.6592953E+00 | −2.4959772E−01 | −2.1358643E+00 | −1.0787950E+01 |
| A13 | −4.2499232E+00 | 2.4724333E−01 | 1.9988471E+01 | 3.9398168E+00 |

TABLE 8-continued

| | | Example 4 | | |
|---|---|---|---|---|
| A14 | 6.6708435E-01 | -4.1975026E-01 | -1.4717887E+01 | -3.2596588E-01 |
| A15 | 1.2882481E-01 | 3.1027424E-01 | 3.5219278E+00 | -1.8707504E-01 |
| A16 | 1.7644309E-02 | -7.5548377E-02 | -5.3404673E-02 | 4.1397019E-02 |

| Surface No. | 3 | 6 | 9 | 12 |
|---|---|---|---|---|
| KA | 2.9110536E+01 | -1.9245152E+03 | 7.2373217E-01 | -1.0243831E+01 |
| A3 | 0.0000000E+00 | 0.0000000E+00 | 0.0000000E+00 | 0.0000000E+00 |
| A4 | -1.4029126E-01 | -2.0082013E-01 | -6.4144828E-01 | -1.9132917E-01 |
| A5 | -1.4571337E-01 | 5.6753296E+00 | 2.5708178E+00 | 6.2536286E-02 |
| A6 | -2.2605827E-01 | -1.9093983E+00 | -1.8811076E+00 | 4.6985345E-02 |
| A7 | 7.1619035E+00 | 2.9616481E+00 | -1.0980265E+00 | -2.2529905E-02 |
| A8 | -1.6922557E+01 | -8.3119568E-01 | -8.8630538E-01 | -2.4949640E-03 |
| A9 | 6.2176753E+00 | -1.7894815E+00 | 5.8418285E+00 | 2.2970497E-03 |
| A10 | 2.4195021E+01 | -2.8074621E+00 | -5.1425961E+00 | 4.1199316E-04 |
| A11 | -3.0387274E+01 | 7.7289565E+00 | 1.7489238E+00 | 3.5565478E-04 |
| A12 | 5.4398341E+00 | -1.3497437E+00 | -7.1108418E-01 | -5.3964838E-04 |
| A13 | 2.5254855E+00 | -3.6396325E+00 | -2.6210301E-01 | 5.4252118E-05 |
| A14 | 1.1728572E+00 | -2.3011891E+00 | 1.4803163E+00 | 6.5954171E-05 |
| A15 | -1.3540016E+01 | 5.3168001E+00 | -1.1404671E+00 | -2.0769867E-05 |
| A16 | 4.0451229E+00 | -1.8850196E+00 | 2.7339907E-01 | 1.8641111E-06 |

| Surface No. | 4 | 7 | 10 | 13 |
|---|---|---|---|---|
| KA | -2.1540963E+01 | -9.4287262E+01 | -3.0362847E+00 | -5.5944505E+00 |
| A3 | 0.0000000E+00 | 0.0000000E+00 | 0.0000000E+00 | 0.0000000E+00 |
| A4 | -3.2598507E-01 | -3.1460061E-01 | -4.9967153E-01 | -2.6228850E-01 |
| A5 | 7.5962432E-02 | 7.3903472E-01 | 1.7324348E+00 | 2.7355052E-01 |
| A6 | 1.4621310E+00 | -9.0561998E-01 | 1.5711639E-01 | -1.2004066E-01 |
| A7 | -1.9496957E+00 | -1.4589623E+00 | -5.2999400E+00 | 4.7825261E-03 |
| A8 | 7.7581603E+00 | 4.5613836E+00 | 5.4040225E+00 | 2.0605988E-02 |
| A9 | 1.8900676E-01 | -2.5421689E+00 | -1.0860452E+00 | -1.1852466E-02 |
| A10 | -4.7024942E+00 | -1.9293217E+00 | 1.1265298E-01 | 3.5352917E-03 |
| A11 | 1.3747008E+01 | -5.3434718E-01 | -1.2485118E+00 | -1.0385681E-04 |
| A12 | -1.6974639E+01 | 5.3286243E+00 | 1.8036372E+00 | -6.2570033E-04 |
| A13 | 9.3984447E+00 | -3.0904654E+00 | -2.5492216E+00 | 3.6450775E-04 |
| A14 | -1.6839940E-01 | -1.0533288E+00 | 2.3719674E+00 | -1.0070198E-04 |
| A15 | -2.6527741E+00 | 1.2593111E+00 | -1.0577212E+00 | 1.4200688E-05 |
| A16 | 1.0769598E+00 | -2.5186442E-01 | 1.7591304E-01 | -8.1957300E-07 |

TABLE 9

Example 5
f = 4.114, Bf = 1.073, Fno. = 2.05, 2ω = 74.0

| Si | Ri | Di | Ndj | vdj |
|---|---|---|---|---|
| 1(St) | ∞ | -0.125 | | |
| *2 | 1.78087 | 0.617 | 1.54488 | 54.87 |
| *3 | -116.44968 | 0.054 | | |
| *4 | 4.59390 | 0.260 | 1.63350 | 23.62 |
| *5 | 1.94694 | 0.350 | | |
| *6 | 9.93846 | 0.496 | 1.54488 | 54.87 |
| *7 | -56.76214 | 0.360 | | |
| *8 | 25.14618 | 0.353 | 1.54488 | 54.87 |
| *9 | -1.86982 | 0.086 | | |
| *10 | -1.31410 | 0.277 | 1.63350 | 23.62 |
| *11 | -1.49127 | 0.328 | | |
| *12 | -26.03380 | 0.466 | 1.54488 | 54.87 |
| *13 | 1.47787 | 0.400 | | |
| 14 | ∞ | 0.210 | 1.51633 | 64.14 |
| 15 | ∞ | 0.534 | | |
| 16(IMG) | ∞ | | | |

TABLE 10

| | Example 5 | | | |
|---|---|---|---|---|
| Surface No. | 2 | 5 | 8 | 11 |
| KA | 1.3095166E+00 | -7.1610948E+00 | 1.6985330E+02 | 1.0009756E-01 |
| A3 | 0.0000000E+00 | 0.0000000E+00 | 0.0000000E+00 | 0.0000000E+00 |
| A4 | -1.2551507E-02 | -1.3879919E-01 | -2.4501480E-01 | 3.3975006E-01 |
| A5 | -7.2375139E-02 | 1.4477201E-01 | 5.8371753E-01 | 2.7885384E-01 |
| A6 | 4.9861618E-01 | 3.3256430E-01 | -9.9984590E-01 | -6.1372197E-01 |
| A7 | -2.1211014E+00 | -5.1078867E-02 | 3.4949998E-02 | -2.1061099E-01 |
| A8 | 4.6481347E+00 | -5.8578248E-01 | 9.4995209E-01 | 2.4761972E-01 |
| A9 | -3.0936577E+00 | 2.2171292E-01 | 1.6628424E+00 | 4.1266579E-01 |
| A10 | -7.3781002E+00 | 1.2244933E-01 | -4.8066267E+00 | -3.4400008E-01 |
| A11 | 1.5667973E+01 | 3.7015849E-01 | 2.5710460E+00 | 5.3049363E-03 |
| A12 | -4.4798743E+00 | -8.2788544E-01 | 1.2657073E+00 | 4.1463188E-02 |

TABLE 10-continued

| | | Example 5 | | |
|---|---|---|---|---|
| A13 | −1.6015623E+01 | 1.0826554E+00 | −1.1651404E+00 | −4.2198621E−03 |
| A14 | 2.0529350E+01 | −1.0916055E+00 | −3.1257504E−01 | 1.6099262E−03 |
| A15 | −1.0077442E+01 | 6.0766819E−01 | 3.9452881E−01 | −2.1472455E−03 |
| A16 | 1.8572650E+00 | −1.3231258E−01 | −7.2362663E−02 | 4.2763666E−04 |

| Surface No. | 3 | 6 | 9 | 12 |
|---|---|---|---|---|
| KA | 9.0720329E+00 | 8.4260955E+00 | 1.5164298E+00 | 1.0689633E+01 |
| A3 | 0.0000000E+00 | 0.0000000E+00 | 0.0000000E+00 | 0.0000000E+00 |
| A4 | −1.9834487E−01 | −2.8516374E−01 | 6.5891705E−02 | −2.6169216E−01 |
| A5 | −1.2812390E+00 | 7.3539557E−01 | 1.0179219E+00 | 9.8779410E−02 |
| A6 | 9.1461098E+00 | −2.2126228E+00 | −2.1206989E+00 | 5.4891382E−02 |
| A7 | −2.9344551E+01 | 4.8553342E+00 | 1.1236896E+00 | −1.1948896E−01 |
| A8 | 6.3156738E+01 | −7.0792550E+00 | −3.9931683E−01 | 7.8651344E−02 |
| A9 | −8.6982579E+01 | 6.7049406E+00 | 1.5690958E+00 | 1.0372418E−02 |
| A10 | 5.9691750E+01 | −4.1285857E+00 | −1.5272280E+00 | −1.9423838E−02 |
| A11 | −7.1654322E+00 | 1.3589706E+00 | −9.1520571E−03 | 1.0177981E−02 |
| A12 | 2.7734453E+01 | −3.6073710E+00 | 7.2300772E−01 | −1.1909635E−02 |
| A13 | −1.1795687E+02 | 1.4992720E+01 | −2.7629391E−01 | 6.8247533E−03 |
| A14 | 1.4633425E+02 | −2.2893037E+01 | −2.5168474E−01 | −1.4254032E−03 |
| A15 | −8.0094800E+01 | 1.5112202E+01 | 2.5377619E−01 | 3.3840080E−05 |
| A16 | 1.6890954E+01 | −3.6893444E+00 | −6.2919540E−02 | 1.4575176E−05 |

| Surface No. | 4 | 7 | 10 | 13 |
|---|---|---|---|---|
| KA | −2.1341937E+01 | −3.8570372E+01 | −3.0157435E+00 | −5.8744527E+00 |
| A3 | 0.0000000E+00 | 0.0000000E+00 | 0.0000000E+00 | 0.0000000E+00 |
| A4 | −4.0699023E−01 | −3.4376064E−01 | 2.8897475E−01 | −2.5137022E−01 |
| A5 | 1.0829156E−01 | 8.3041082E−01 | 7.4193252E−01 | 2.1326838E−01 |
| A6 | 1.2418885E+00 | −1.6998487E+00 | −1.4550061E+00 | −7.1869115E−02 |
| A7 | −6.8506553E−01 | 1.7990266E+00 | −3.1288501E−01 | −1.3577181E−04 |
| A8 | −7.4781311E−01 | −2.8269103E+00 | 7.3847017E−01 | 9.4073861E−03 |
| A9 | −1.2266645E−01 | 7.4494782E+00 | 8.0996410E−01 | −2.4432921E−03 |
| A10 | −1.6855131E−01 | −9.8784189E+00 | −6.5081888E−01 | −1.5946088E−03 |
| A11 | 9.7771549E−01 | 4.8722766E+00 | −2.7239332E−01 | 1.2034386E−03 |
| A12 | 1.6882742E+00 | −3.4392536E+00 | 1.4945534E−01 | −2.8737077E−05 |
| A13 | −2.1955164E+00 | 1.0782680E+01 | 1.0969983E−01 | −3.0764148E−04 |
| A14 | −1.0168053E+00 | −1.3151072E+01 | −5.5276914E−02 | 1.6050041E−04 |
| A15 | 1.6741459E+00 | 6.6235919E+00 | 3.4952213E−03 | −3.5421743E−05 |
| A16 | −3.8600629E−01 | −1.2143884E+00 | −1.3514471E−04 | 3.0306553E−06 |

TABLE 11

Values Relating to Condition Expression

| No. | Condition Expression | Example 1 | Example 2 | Example 3 | Example 4 | Example 5 |
|---|---|---|---|---|---|---|
| (1) | f/f1 | 1.27 | 1.28 | 1.32 | 1.37 | 1.28 |
| (2) | f/f4 | 1.25 | 1.312 | 1.286 | 1.322 | 1.282 |
| (3) | (L6r + L6f)/(L6r − L6f) | −0.89 | −0.89 | −0.9 | −0.89 | −0.89 |
| (4) | f * P45 | −0.56 | −0.43 | −0.15 | −0.38 | −0.73 |
| (5) | f6/f5 | 0.041 | 0.047 | 0.037 | 0.042 | 0.058 |
| (6) | f/f5 | −0.065 | −0.072 | −0.06 | −0.069 | −0.093 |
| (7) | f/f6 | −1.6 | −1.54 | −1.64 | −1.64 | −1.61 |
| (8) | f * tanω/R6r | 2.1 | 2 | 2.2 | 2.1 | 4.7 |
| (9) | (L1r + L1f)/(L1r − L1f) | 0.83 | 0.86 | 0.88 | 0.77 | 0.97 |

It should be noted that the above-described values of the paraxial radius of curvature, the surface distance, the refractive index, and the Abbe number were obtained by measurement performed by an expert in optical measurement according to the following methods.

The paraxial radius of curvature is obtained by measuring each lens using an ultra-high precision three-dimensional measuring device, UA3P (available from Panasonic Factory Solutions Co., Ltd.), and using the following procedure. Tentative values of paraxial radius of curvature $R_m$ (where m is a natural number) and conic constant $K_m$ are set and inputted to the UA3P, and the n-th order aspheric coefficient An in the formula of aspheric shape is calculated from the tentative values and the measurement data using a fitting function attached to the UA3P. It is assumed that $C=1/R_m$ and $KA=K_m-1$ in the above-described formula (A) of aspheric shape. Based on $R_m$, $K_m$, An, and the formula of aspheric shape, the depth Z of the aspheric surface in the optical axis direction depending on the height h from the optical axis is calculated. Then, for each height h from the optical axis, a difference between the calculated depth Z and the measured depth value Z' is calculated, and whether or not the difference is within a predetermined range is determined. If it is determined that the difference is within the predetermined range, the set value of $R_m$ is used as the paraxial radius of curvature. On the other hand, if the difference is out of the predetermined range, $R_{m+1}$ and $K_{m+1}$ are set by changing at least one of the values of $R_m$ and $K_{m+1}$ used to calculate the difference, and are inputted to the UA3P to perform the above-described calculations, and then, for each height h from the optical axis, whether or not a difference between the calculated depth Z and the measured depth value Z' is within the predetermined range is determined. This operation is repeated until the difference between the calculated depth Z and the measured depth value Z' for each height h from the optical axis falls within the predetermined range. It should be noted that the predetermined range here is within 200 nm. The range of the height h is within the range from 0 to ⅕ of the maximum outer diameter of the lens.

The surface distance is obtained by measurement using a central thickness and surface spacing measurement device, OPTISURF® (available from Trioptics), for length measurement of an assembled lens.

The refractive index is obtained by measurement using a precision refractometer, KPR-2000 (available from Shimadzu Corporation), with a subject temperature of 25° C. A refractive index measured with respect to the d-line (the wavelength of 587.6 nm) is refractive index Nd. Similarly, a refractive index measured with respect to the e-line (the wavelength of 546.1 nm) is a refractive index Ne, a refractive index measured with respect to the F-line (the wavelength of 486.1 nm) is refractive index NF, a refractive index measured with respect to the C-line (the wavelength of 656.3 nm) is refractive index NC, and a refractive index measured with respect to the g-line (the wavelength of 435.8 nm) is refractive index Ng. The Abbe number vd with respect to the d-line is obtained by calculating:

$$vd=(Nd-1)/(NF-NC)$$

by substituting the values of Nd, NF and NC obtained by the above-described measurement into the above equation.

What is claimed is:

1. An imaging lens substantially consisting of six lenses consisting of, in order from an object side:
   a first lens having a biconvex shape;
   a second lens having a negative refractive power;
   a third lens having a positive refractive power;
   a fourth lens having a positive refractive power;
   a fifth lens having a negative refractive power and having a concave surface toward the object side; and
   a sixth lens having a negative refractive power and having a concave surface toward the object side,
   wherein the condition expression below is satisfied:

$$-1 < f \times P45 < 0 \tag{4}$$

where f is a focal length of the entire system, and P45 is a refractive power of an air lens formed by an image-side surface of the fourth lens and an object-side surface of the fifth lens, where the refractive power of the air lens is calculated according to the equation (P) below:

$$P45 = \frac{1-Nd4}{L4r} + \frac{Nd5-1}{L5f} - \frac{(1-Nd4) \times (Nd5-1) \times D9}{L4r \times L5f} \tag{P}$$

where Nd4 is a refractive index with respect to the d-line of the fourth lens, Nd5 is a refractive index with respect to the d-line of the fifth lens, L4r is a paraxial radius of curvature of an image-side surface of the fourth lens, L5f is a paraxial radius of curvature of an object-side surface of the fifth lens, and D9 is an air space along the optical axis between the fourth lens and the fifth lens.

2. The imaging lens as claimed in claim 1, wherein the sixth lens has a concave surface toward an image side.

3. The imaging lens as claimed in claim 1, wherein the fifth lens has a convex surface toward an image side.

4. The imaging lens as claimed in claim 1, wherein the second lens has a concave surface toward an image side.

5. The imaging lens as claimed in claim 1, wherein the condition expression below is further satisfied:

$$0.7 < f/f1 < 5 \tag{1}$$

where f is a focal length of the entire system, and f1 is a focal length of the first lens.

6. The imaging lens as claimed in claim 1, wherein the condition expression below is further satisfied:

$$1.18 < f/f4 < 5 \tag{2}$$

where f is a focal length of the entire system, and f4 is a focal length of the fourth lens.

7. The imaging lens as claimed in claim 1, wherein the condition expression below is further satisfied:

$$-1.6 < (L6r+L6f)/(L6r-L6f) < -0.7 \tag{3}$$

where L6f is a paraxial radius of curvature of an object-side surface of the sixth lens, and L6r is a paraxial radius of curvature of an image-side surface of the sixth lens.

8. The imaging lens as claimed in claim 1, wherein the condition expression below is further satisfied:

$$0 < f6/f5 < 0.11 \tag{5}$$

where f5 is a focal length of the fifth lens, and f6 is a focal length of the sixth lens.

9. The imaging lens as claimed in claim 1, wherein the condition expression below is further satisfied:

$$-3 < f/f5 < -0.05 \tag{6}$$

where f is a focal length of the entire system, and f5 is a focal length of the fifth lens.

10. The imaging lens as claimed in claim 1, wherein the condition expression below is further satisfied:

$$-3 < f/f6 < -1.47 \tag{7}$$

where f is a focal length of the entire system, and f6 is a focal length of the sixth lens.

11. The imaging lens as claimed in claim 1, wherein the condition expression below is further satisfied:

$$0.5 < f \tan \omega / L6r < 20 \tag{8}$$

where f is a focal length of the entire system, ω is a half angle of view, and L6r is a paraxial radius of curvature of an image-side surface of the sixth lens.

12. The imaging lens as claimed in claim 1, wherein the condition expression below is further satisfied:

$$0.5 < (L1r+L1f)/(L1r-L1f) < 1 \tag{9}$$

where L1f is a paraxial radius of curvature of an object-side surface of the first lens, and L1r is a paraxial radius of curvature of an image-side surface of the first lens.

13. The imaging lens as claimed in claim 5, wherein the condition expression below is further satisfied:

$$1.1 < f/f1 < 3 \tag{1-1}$$

14. The imaging lens as claimed in claim 6, wherein the condition expression below is further satisfied:

$$1.21 < f/f4 < 5 \tag{2-1}$$

15. The imaging lens as claimed in claim 7, wherein the condition expression below is further satisfied:

$$-0.92 < (L6r + L6f)/(L6r - L6f) < -0.7 \quad (3\text{-}1).$$

16. The imaging lens as claimed in claim 1, wherein the condition expression below is further satisfied:

$$-0.88 < f \times P45 < 0 \quad (4\text{-}1).$$

17. The imaging lens as claimed in claim 8, wherein the condition expression below is further satisfied:

$$0.035 < f6/f5 < 0.08 \quad (5\text{-}1).$$

18. The imaging lens as claimed in claim 9, wherein the condition expression below is further satisfied:

$$-0.19 < f/f5 < -0.055 \quad (6\text{-}1).$$

19. An imaging device comprising the imaging lens as claimed in claim 1.

* * * * *